US010699448B2

(12) United States Patent
Weingarten et al.

(10) Patent No.: US 10,699,448 B2
(45) Date of Patent: Jun. 30, 2020

(54) SYSTEM AND METHOD FOR IDENTIFYING, MARKING AND NAVIGATING TO A TARGET USING REAL TIME TWO DIMENSIONAL FLUOROSCOPIC DATA

(71) Applicant: COVIDIEN LP, Mansfield, MA (US)

(72) Inventors: Oren P. Weingarten, Herzliya (IL); Ron Barak, Tel Aviv (IL); Evgeni Kopel, Barkan (IL); Benjamin Greenburg, Hod Hasharon (IL); Efrat Kedmi-Shahar, Pardesia (IL); Dafna Mardix, Herzliya (IL); Ariel Birenbaum, Tel Aviv (IL); Guy Alexandroni, Ramat Hasharon (IL); Eyal Klein, Tel Aviv (IL)

(73) Assignee: COVIDIEN LP, Mansfield, MA (US)

( * ) Notice: Subject to any disclaimer, the term of this patent is extended or adjusted under 35 U.S.C. 154(b) by 196 days.

(21) Appl. No.: 16/022,222

(22) Filed: Jun. 28, 2018

(65) Prior Publication Data

US 2019/0005687 A1 Jan. 3, 2019

Related U.S. Application Data

(60) Provisional application No. 62/641,777, filed on Mar. 12, 2018, provisional application No. 62/628,017, (Continued)

(51) Int. Cl.
*G06T 11/00* (2006.01)
*G06T 19/00* (2011.01)
(Continued)

(52) U.S. Cl.
CPC .......... *G06T 11/008* (2013.01); *G06T 7/0012* (2013.01); *G06T 15/08* (2013.01); (Continued)

(58) Field of Classification Search
CPC ..... G06T 11/008; G06T 7/0012; G06T 15/08; G06T 19/00; G06T 19/003;
(Continued)

(56) References Cited

U.S. PATENT DOCUMENTS

| 4,686,695 A | 8/1987 | Macovski |
| 5,042,486 A | 8/1991 | Pfeiler et al. |

(Continued)

FOREIGN PATENT DOCUMENTS

| DE | 19919907 A1 | 11/2000 |
| DE | 69726415 T2 | 9/2004 |

(Continued)

OTHER PUBLICATIONS

Patcharapong Suntharos, et al., "Real-time three dimensional CT and MRI to guide interventions for congenital heart disease and acquired pulmonary vein stenosis", Int. J. Cardiovasc. Imaging, vol. 33, pp. 1619-1626 (2017).

(Continued)

*Primary Examiner* — Pakee Fang
(74) *Attorney, Agent, or Firm* — Carter, DeLuca & Farrell LLP

(57) ABSTRACT

A system for facilitating identification and marking of a target in a fluoroscopic image of a body region of a patient, the system comprising one or more storage devices having stored thereon instructions for: receiving a CT scan and a fluoroscopic 3D reconstruction of the body region of the patient, wherein the CT scan includes a marking of the target; and generating at least one virtual fluoroscopy image based on the CT scan of the patient, wherein the virtual fluoroscopy image includes the target and the marking of the target, at least one hardware processor configured to execute (Continued)

these instructions, and a display configured to display to a user the virtual fluoroscopy image and the fluoroscopic 3D reconstruction.

16 Claims, 7 Drawing Sheets

Related U.S. Application Data filed on Feb. 8, 2018, provisional application No. 62/570,431, filed on Oct. 10, 2017, provisional application No. 62/526,798, filed on Jun. 29, 2017.

(51) Int. Cl.
*G06T 15/08* (2011.01)
*G06T 7/00* (2017.01)

(52) U.S. Cl.
CPC ............ *G06T 19/00* (2013.01); *G06T 19/003* (2013.01); *G06T 2200/24* (2013.01); *G06T 2207/10081* (2013.01); *G06T 2207/10121* (2013.01); *G06T 2207/20104* (2013.01); *G06T 2207/30204* (2013.01); *G06T 2207/30241* (2013.01); *G06T 2210/41* (2013.01); *G06T 2211/428* (2013.01); *G06T 2219/004* (2013.01)

(58) Field of Classification Search
CPC ....... G06T 2200/24; G06T 2207/10081; G06T 2207/10121; G06T 2207/20104; G06T 2207/30204; G06T 2207/30241; G06T 2210/41; G06T 2211/428; G06T 2219/004
See application file for complete search history.

(56) References Cited

U.S. PATENT DOCUMENTS

| | | |
|---|---|---|
| 5,251,635 A | 10/1993 | Dumoulin et al. |
| 5,376,795 A | 12/1994 | Hasegawa et al. |
| 5,383,454 A | 1/1995 | Bucholz |
| 5,588,033 A | 12/1996 | Yeung |
| 5,622,170 A | 4/1997 | Schulz |
| 5,638,819 A | 6/1997 | Manwaring et al. |
| 5,647,361 A | 7/1997 | Damadian |
| 5,706,324 A | 1/1998 | Wiesent et al. |
| 5,744,802 A | 4/1998 | Muehllehner et al. |
| 5,772,594 A | 6/1998 | Barrick |
| 5,829,444 A | 11/1998 | Ferre et al. |
| 5,852,646 A | 12/1998 | Klotz et al. |
| 5,873,822 A | 2/1999 | Ferre et al. |
| 5,902,239 A | 5/1999 | Buurman |
| 5,909,476 A | 6/1999 | Cheng et al. |
| 5,930,329 A | 7/1999 | Navab |
| 5,951,475 A | 9/1999 | Gueziec et al. |
| 5,963,612 A | 10/1999 | Navab |
| 5,963,613 A | 10/1999 | Navab |
| 5,980,504 A | 11/1999 | Sharkey et al. |
| 6,038,282 A | 3/2000 | Wiesent et al. |
| 6,049,582 A | 4/2000 | Navab |
| 6,050,724 A | 4/2000 | Schmitz et al. |
| 6,055,449 A | 4/2000 | Navab |
| 6,081,577 A | 6/2000 | Webber |
| 6,092,928 A | 7/2000 | Mattson et al. |
| 6,118,845 A | 9/2000 | Simon et al. |
| 6,120,180 A | 9/2000 | Graumann |
| 6,139,183 A | 10/2000 | Graumann |
| 6,149,592 A | 11/2000 | Yanof et al. |
| 6,188,355 B1 | 2/2001 | Gilboa |
| 6,236,704 B1 | 5/2001 | Navab et al. |
| 6,243,439 B1 | 6/2001 | Arai et al. |
| 6,285,739 B1 | 9/2001 | Rudin et al. |
| 6,289,235 B1 | 9/2001 | Webber et al. |
| 6,307,908 B1 | 10/2001 | Hu |
| 6,314,310 B1 | 11/2001 | Ben-Haim et al. |
| 6,317,621 B1 | 11/2001 | Graumann et al. |
| 6,351,513 B1 | 2/2002 | Bani-Hashemi et al. |
| 6,359,960 B1 | 3/2002 | Wahl et al. |
| 6,382,835 B2 | 5/2002 | Graumann et al. |
| 6,389,104 B1 | 5/2002 | Bani-Hashemi et al. |
| 6,404,843 B1 | 6/2002 | Vaillant |
| 6,424,731 B1 | 7/2002 | Launay et al. |
| 6,470,207 B1 | 10/2002 | Simon et al. |
| 6,484,049 B1 | 11/2002 | Seeley et al. |
| 6,485,422 B1 | 11/2002 | Mikus et al. |
| 6,490,475 B1 | 12/2002 | Seeley et al. |
| 6,491,430 B1 | 12/2002 | Seissler |
| 6,546,068 B1 | 4/2003 | Shimura |
| 6,546,279 B1 | 4/2003 | Bova et al. |
| 6,549,607 B1 | 4/2003 | Webber |
| 6,580,938 B1 | 6/2003 | Acker |
| 6,585,412 B2 | 7/2003 | Mitschke |
| 6,662,036 B2 | 12/2003 | Cosman |
| 6,666,579 B2 | 12/2003 | Jensen |
| 6,697,664 B2 | 2/2004 | Kienzle, III et al. |
| 6,707,878 B2 | 3/2004 | Claus et al. |
| 6,714,810 B2 | 3/2004 | Grzeszczuk et al. |
| 6,731,283 B1 | 5/2004 | Navab |
| 6,731,970 B2 | 5/2004 | Schlossbauer et al. |
| 6,768,784 B1 | 7/2004 | Green et al. |
| 6,782,287 B2 | 8/2004 | Grzeszczuk et al. |
| 6,785,356 B2 | 8/2004 | Grass et al. |
| 6,785,571 B2 | 8/2004 | Glossop |
| 6,801,597 B2 | 10/2004 | Webber |
| 6,810,278 B2 | 10/2004 | Webber et al. |
| 6,823,207 B1 | 11/2004 | Jensen et al. |
| 6,851,855 B2 | 2/2005 | Mitschke et al. |
| 6,856,826 B2 | 2/2005 | Seeley et al. |
| 6,856,827 B2 | 2/2005 | Seeley et al. |
| 6,865,253 B2 | 3/2005 | Blumhofer et al. |
| 6,898,263 B2 | 5/2005 | Avinash et al. |
| 6,912,265 B2 | 6/2005 | Hebecker et al. |
| 6,928,142 B2 | 8/2005 | Shao et al. |
| 6,944,260 B2 | 9/2005 | Hsieh et al. |
| 6,956,927 B2 | 10/2005 | Sukeyasu et al. |
| 7,010,080 B2 | 3/2006 | Mitschke et al. |
| 7,010,152 B2 | 3/2006 | Bojer et al. |
| 7,016,457 B1 | 3/2006 | Senzig et al. |
| 7,035,371 B2 | 4/2006 | Boese et al. |
| 7,048,440 B2 | 5/2006 | Graumann et al. |
| 7,066,646 B2 | 6/2006 | Pescatore et al. |
| 7,106,825 B2 | 9/2006 | Gregerson et al. |
| 7,117,027 B2 | 10/2006 | Zheng et al. |
| 7,129,946 B2 | 10/2006 | Ditt et al. |
| 7,130,676 B2 | 10/2006 | Barrick |
| 7,142,633 B2 | 11/2006 | Eberhard et al. |
| 7,147,373 B2 | 12/2006 | Cho et al. |
| 7,165,362 B2 | 1/2007 | Jobs et al. |
| 7,186,023 B2 | 3/2007 | Morita et al. |
| 7,233,820 B2 | 6/2007 | Gilboa |
| 7,251,522 B2 | 7/2007 | Essenreiter et al. |
| 7,327,872 B2 | 2/2008 | Vaillant et al. |
| 7,343,195 B2 | 3/2008 | Strommer et al. |
| 7,369,641 B2 | 5/2008 | Tsubaki et al. |
| 7,426,256 B2 | 9/2008 | Rasche et al. |
| 7,440,538 B2 | 10/2008 | Tsujii |
| 7,467,007 B2 | 12/2008 | Lothert |
| 7,474,913 B2 | 1/2009 | Durlak |
| 7,502,503 B2 | 3/2009 | Bojer et al. |
| 7,505,549 B2 | 3/2009 | Ohishi et al. |
| 7,508,388 B2 | 3/2009 | Barfuss et al. |
| 7,603,155 B2 | 10/2009 | Jensen |
| 7,620,223 B2 | 11/2009 | Xu et al. |
| 7,639,866 B2 | 12/2009 | Pomero et al. |
| 7,664,542 B2 | 2/2010 | Boese et al. |
| 7,671,887 B2 | 3/2010 | Pescatore et al. |
| 7,689,019 B2 | 3/2010 | Boese et al. |
| 7,689,042 B2 | 3/2010 | Brunner et al. |
| 7,693,263 B2 | 4/2010 | Bouvier et al. |
| 7,711,082 B2 | 5/2010 | Fujimoto et al. |
| 7,711,083 B2 | 5/2010 | Heigl et al. |
| 7,711,409 B2 | 5/2010 | Keppel et al. |
| 7,712,961 B2 | 5/2010 | Horndler et al. |
| 7,720,520 B2 | 5/2010 | Willis |

(56) References Cited

U.S. PATENT DOCUMENTS

| | | |
|---|---|---|
| 7,725,165 B2 | 5/2010 | Chen et al. |
| 7,734,329 B2 | 6/2010 | Boese et al. |
| 7,742,557 B2 | 6/2010 | Brunner et al. |
| 7,761,135 B2 | 7/2010 | Pfister et al. |
| 7,778,685 B2 | 8/2010 | Evron et al. |
| 7,778,690 B2 | 8/2010 | Boese et al. |
| 7,787,932 B2 | 8/2010 | Vilsmeier et al. |
| 7,804,991 B2 | 9/2010 | Abovitz et al. |
| 7,831,096 B2 | 11/2010 | Williamson, Jr. |
| 7,835,779 B2 | 11/2010 | Anderson et al. |
| 7,844,094 B2 | 11/2010 | Jeung et al. |
| 7,853,061 B2 | 12/2010 | Gorges et al. |
| 7,877,132 B2 | 1/2011 | Rongen et al. |
| 7,899,226 B2 | 3/2011 | Pescatore et al. |
| 7,907,989 B2 | 3/2011 | Borgert et al. |
| 7,912,180 B2 | 3/2011 | Zou et al. |
| 7,912,262 B2 | 3/2011 | Timmer et al. |
| 7,949,088 B2 | 5/2011 | Nishide et al. |
| 7,950,849 B2 | 5/2011 | Claus et al. |
| 7,991,450 B2 | 8/2011 | Virtue et al. |
| 8,000,436 B2 | 8/2011 | Seppi et al. |
| 8,043,003 B2 | 10/2011 | Vogt et al. |
| 8,045,780 B2 | 10/2011 | Boese et al. |
| 8,050,739 B2 | 11/2011 | Eck et al. |
| 8,090,168 B2 | 1/2012 | Washburn et al. |
| 8,104,958 B2 | 1/2012 | Weiser et al. |
| 8,111,894 B2 | 2/2012 | Van De Haar |
| 8,111,895 B2 | 2/2012 | Spahn |
| 8,126,111 B2 | 2/2012 | Uhde et al. |
| 8,126,241 B2 | 2/2012 | Zarkh et al. |
| 8,150,131 B2 | 4/2012 | Harer et al. |
| 8,180,132 B2 | 5/2012 | Gorges et al. |
| 8,195,271 B2 | 6/2012 | Rahn |
| 8,200,316 B2 | 6/2012 | Keppel et al. |
| 8,208,708 B2 | 6/2012 | Homan et al. |
| 8,229,061 B2 | 7/2012 | Hanke et al. |
| 8,248,413 B2 | 8/2012 | Gattani et al. |
| 8,270,691 B2 | 9/2012 | Xu et al. |
| 8,271,068 B2 | 9/2012 | Khamene et al. |
| 8,275,448 B2 | 9/2012 | Camus et al. |
| 8,306,303 B2 | 11/2012 | Bruder et al. |
| 8,311,617 B2 | 11/2012 | Keppel et al. |
| 8,320,992 B2 | 11/2012 | Frenkel et al. |
| 8,326,403 B2 | 12/2012 | Pescatore et al. |
| 8,340,379 B2 | 12/2012 | Razzaque et al. |
| 8,345,817 B2 | 1/2013 | Fuchs et al. |
| 8,374,416 B2 | 2/2013 | Gagesch et al. |
| 8,374,678 B2 | 2/2013 | Graumann |
| 8,423,117 B2 | 4/2013 | Pichon et al. |
| 8,442,618 B2 | 5/2013 | Strommer et al. |
| 8,467,589 B2 | 6/2013 | Averbuch et al. |
| 8,515,527 B2 | 8/2013 | Vaillant et al. |
| 8,526,688 B2 | 9/2013 | Groszmann et al. |
| 8,526,700 B2 | 9/2013 | Isaacs |
| 8,532,258 B2 | 9/2013 | Bulitta et al. |
| 8,532,259 B2 | 9/2013 | Shedlock et al. |
| 8,548,567 B2 | 10/2013 | Maschke et al. |
| 8,565,858 B2 | 10/2013 | Gilboa |
| 8,625,869 B2 | 1/2014 | Harder et al. |
| 8,666,137 B2 | 3/2014 | Nielsen et al. |
| 8,670,603 B2 | 3/2014 | Tolkowsky et al. |
| 8,675,996 B2 | 3/2014 | Liao et al. |
| 8,693,622 B2 | 4/2014 | Graumann et al. |
| 8,693,756 B2 | 4/2014 | Tolkowsky et al. |
| 8,694,075 B2 | 4/2014 | Groszmann et al. |
| 8,706,186 B2 | 4/2014 | Fichtinger et al. |
| 8,712,129 B2 | 4/2014 | Strommer et al. |
| 8,718,346 B2 | 5/2014 | Isaacs et al. |
| 8,750,582 B2 | 6/2014 | Boese et al. |
| 8,755,587 B2 | 6/2014 | Bender et al. |
| 8,781,064 B2 | 7/2014 | Fuchs et al. |
| 8,792,704 B2 | 7/2014 | Isaacs |
| 8,798,339 B2 | 8/2014 | Mielekamp et al.ke |
| 8,831,310 B2 | 9/2014 | Razzaque et al. |
| 8,855,748 B2 | 10/2014 | Keppel et al. |
| 9,001,121 B2 | 4/2015 | Finlayson et al. |
| 9,001,962 B2 | 4/2015 | Funk |
| 9,008,367 B2 | 4/2015 | Tolkowsky et al. |
| 9,031,188 B2 | 5/2015 | Belcher et al. |
| 9,036,777 B2 | 5/2015 | Ohishi et al. |
| 9,042,624 B2 | 5/2015 | Dennerlein |
| 9,044,190 B2 | 6/2015 | Rubner et al. |
| 9,044,254 B2 | 6/2015 | Ladtkow et al. |
| 9,087,404 B2 | 7/2015 | Hansis et al. |
| 9,095,252 B2 | 8/2015 | Popovic |
| 9,104,902 B2 | 8/2015 | Xu et al. |
| 9,111,175 B2 | 8/2015 | Strommer et al. |
| 9,135,706 B2 | 9/2015 | Zagorchev et al. |
| 9,171,365 B2 | 10/2015 | Mareachen et al. |
| 9,179,878 B2 | 11/2015 | Jeon |
| 9,216,065 B2 | 12/2015 | Cohen et al. |
| 9,232,924 B2 | 1/2016 | Liu et al. |
| 9,262,830 B2 | 2/2016 | Bakker et al. |
| 9,265,468 B2 | 2/2016 | Rai et al. |
| 9,277,893 B2 | 3/2016 | Tsukagoshi et al. |
| 9,280,837 B2 | 3/2016 | Grass et al. |
| 9,282,944 B2 | 3/2016 | Fallavollita et al. |
| 9,401,047 B2 | 7/2016 | Bogoni et al. |
| 9,406,134 B2 | 8/2016 | Klingenbeck-Regn |
| 9,445,772 B2 | 9/2016 | Callaghan |
| 9,445,776 B2 | 9/2016 | Han et al. |
| 9,466,135 B2 | 10/2016 | Koehler et al. |
| 9,743,896 B2 | 8/2017 | Averbuch |
| 2002/0045916 A1 | 4/2002 | Gray et al. |
| 2002/0122536 A1 | 9/2002 | Kerrien et al. |
| 2002/0163996 A1 | 11/2002 | Kerrien et al. |
| 2002/0188194 A1 | 12/2002 | Cosman |
| 2003/0088179 A1 | 5/2003 | Seeley et al. |
| 2005/0143777 A1* | 6/2005 | Sra .............. G06F 19/3481 607/4 |
| 2005/0220264 A1 | 10/2005 | Homegger |
| 2005/0245807 A1 | 11/2005 | Boese et al. |
| 2005/0281385 A1 | 12/2005 | Johnson et al. |
| 2006/0182216 A1 | 8/2006 | Lauritsch et al. |
| 2006/0251213 A1 | 11/2006 | Bernhardt et al. |
| 2006/0262970 A1 | 11/2006 | Boese et al. |
| 2007/0276216 A1 | 11/2007 | Beyar et al. |
| 2008/0262342 A1 | 10/2008 | Averbruch |
| 2011/0085720 A1 | 4/2011 | Averbuch |
| 2014/0046315 A1 | 2/2014 | Ladtkow et al. |
| 2015/0227679 A1 | 8/2015 | Kamer et al. |
| 2016/0000303 A1 | 1/2016 | Klein et al. |
| 2016/0005194 A1 | 1/2016 | Schretter et al. |
| 2016/0019716 A1* | 1/2016 | Huang ............ G06T 3/0068 345/633 |
| 2016/0125605 A1* | 5/2016 | Lee ............. G06T 11/008 382/131 |
| 2016/0206380 A1 | 7/2016 | Sparks et al. |
| 2016/0287343 A1 | 10/2016 | Eichler et al. |
| 2016/0302747 A1* | 10/2016 | Averbuch ............ A61B 34/20 |
| 2017/0035379 A1 | 2/2017 | Weingarten et al. |
| 2017/0035380 A1 | 2/2017 | Barak et al. |
| 2017/0258418 A1* | 9/2017 | Averbuch ........... A61B 6/5235 |
| 2018/0296283 A1* | 10/2018 | Crawford ........... A61B 34/32 |

FOREIGN PATENT DOCUMENTS

| | | |
|---|---|---|
| DE | 10 2004 004 620 A1 | 8/2005 |
| EP | 0917855 A1 | 5/1999 |
| EP | 1593343 A2 | 11/2005 |
| WO | 9926826 A2 | 6/1999 |
| WO | 9944503 A1 | 9/1999 |
| WO | 0010456 A1 | 3/2000 |
| WO | 0016684 A1 | 3/2000 |
| WO | 0167035 A1 | 9/2001 |
| WO | 0187136 A2 | 11/2001 |
| WO | 2004081877 A1 | 9/2004 |
| WO | 2005015125 A1 | 2/2005 |
| WO | 2005082246 A1 | 9/2005 |

(56) References Cited

FOREIGN PATENT DOCUMENTS

WO        2009081297 A2     7/2009
WO        2015101948 A2     7/2015

OTHER PUBLICATIONS

International Search Report and Written Opinion of the International Searching Authority issued in corresponding Appl. No. PCT/US2018/040222 dated Nov. 12, 2018 (16 pages).

Extended European Search Report from Appl. No. EP 16182953.6-1666 dated Jan. 2, 2017.

CT scan—Wikipedia, the free encyclopedia [retrieved from internet on Mar. 30, 2017]. <URL:http://web.archive.org/web/20150630170453/https://en.wikipedia.org/wiki/CT_scan > published on Jun. 30, 2015 as per Wayback Machine.

Australian Examination Report No. 2 issued in Appl. No. AU 2016210747 dated Oct. 18, 2017 (4 pages).

Canadian Office Action issued in Appl. No. 2,937,825 dated Mar. 26, 2018 (4 pages).

G. Ramm and A.I. Katsevich, The Radon Transform and Local Tomography, CRC Press, 1996.

F. Natterer, The Mathematics of Computerized Tomography, Wiley, 1989.

G.T. Herman et al., Basic Methods of Tomography and Inverse Problems, Hildger, 1987.

G.T. Herman and Attila Kuba, Discrete Tomography, Birhauser, 1999.

* cited by examiner

SYSTEM AND METHOD FOR IDENTIFYING, MARKING AND NAVIGATING TO A TARGET USING REAL TIME TWO DIMENSIONAL FLUOROSCOPIC DATA

CROSS-REFERENCE TO RELATED APPLICATIONS

This application claims priority to U.S. Provisional Application Ser. No. 62/526,798, filed on Jun. 29, 2017, the entire content of which is incorporated by reference herein. This application also claims priority to U.S. Provisional Application Ser. No. 62/641,777, filed on Mar. 12, 2018, the entire content of which is incorporated by reference herein. This application further claims priority to U.S. Provisional Application Ser. No. 62/628,017, filed on Feb. 8, 2018, the entire content of which is incorporated by reference herein. In addition, this application also claims priority to U.S. Provisional Application Ser. No. 62/570,431, filed on Oct. 10, 2017, the entire content of which is incorporated by reference herein.

BACKGROUND

Technical Field

The present disclosure relates to the field of identifying and marking a target in fluoroscopic images, in general, and to such target identification and marking in medical procedures involving intra-body navigation, in particular. Furthermore, the present disclosure relates to a system, apparatus, and method of navigation in medical procedures.

Description of Related Art

There are several commonly applied medical methods, such as endoscopic procedures or minimally invasive procedures, for treating various maladies affecting organs including the liver, brain, heart, lung, gall bladder, kidney and bones. Often, one or more imaging modalities, such as magnetic resonance imaging (MRI), ultrasound imaging, computed tomography (CT), fluoroscopy as well as others are employed by clinicians to identify and navigate to areas of interest within a patient and ultimately a target for treatment. In some procedures, pre-operative scans may be utilized for target identification and intraoperative guidance. However, real-time imaging may be often required to obtain a more accurate and current image of the target area. Furthermore, real-time image data displaying the current location of a medical device with respect to the target and its surrounding may be required to navigate the medical device to the target in a more safe and accurate manner (e.g., with unnecessary or no damage caused to other organs or tissue).

For example, an endoscopic approach has proven useful in navigating to areas of interest within a patient, and particularly so for areas within luminal networks of the body such as the lungs. To enable the endoscopic, and more particularly the bronchoscopic approach in the lungs, endobronchial navigation systems have been developed that use previously acquired MRI data or CT image data to generate a three-dimensional (3D) rendering, model or volume of the particular body part such as the lungs.

The resulting volume generated from the MRI scan or CT scan is then utilized to create a navigation plan to facilitate the advancement of a navigation catheter (or other suitable medical device) through a bronchoscope and a branch of the bronchus of a patient to an area of interest. A locating or tracking system, such as an electromagnetic (EM) tracking system, may be utilized in conjunction with, for example, CT data, to facilitate guidance of the navigation catheter through the branch of the bronchus to the area of interest. In certain instances, the navigation catheter may be positioned within one of the airways of the branched luminal networks adjacent to, or within, the area of interest to provide access for one or more medical instruments.

However, a three-dimensional volume of a patient's lungs, generated from previously acquired scans, such as CT scans, may not provide a basis sufficient for accurate guiding of medical instruments to a target during a navigation procedure. In certain instances, the inaccuracy is caused by deformation of the patient's lungs during the procedure relative to the lungs at the time of the acquisition of the previously acquired CT data. This deformation (CT-to-Body divergence) may be caused by many different factors, for example: sedation vs. no sedation, bronchoscope changing patient pose and also pushing the tissue, different lung volume because CT was in inhale while navigation is during breathing, different bed, day, etc.

Thus, another imaging modality is necessary to visualize such targets in real-time and enhance the in-vivo navigation procedure by correcting navigation during the procedure. Furthermore, in order to accurately and safely navigate medical devices to a remote target, for example, for biopsy or treatment, both the medical device and the target should be visible in some sort of a three-dimensional guidance system.

A fluoroscopic imaging device is commonly located in the operating room during navigation procedures. The standard fluoroscopic imaging device may be used by a clinician, for example, to visualize and confirm the placement of a medical device after it has been navigated to a desired location. However, although standard fluoroscopic images display highly dense objects such as metal tools and bones as well as large soft-tissue objects such as the heart, the fluoroscopic images may have difficulty resolving small soft-tissue objects of interest such as lesions. Furthermore, the fluoroscope image is only a two-dimensional projection. Therefore, an X-ray volumetric reconstruction may enable identification of such soft tissue objects and navigation to the target.

Several solutions exist that provide three-dimensional volume reconstruction such as CT and Cone-beam CT which are extensively used in the medical world. These machines algorithmically combine multiple X-ray projections from known, calibrated X-ray source positions into three-dimensional volume in which, inter alia, soft-tissues are more visible. For example, a CT machine can be used with iterative scans during procedure to provide guidance through the body until the tools reach the target. This is a tedious procedure as it requires several full CT scans, a dedicated CT room and blind navigation between scans. In addition, each scan requires the staff to leave the room due to high-levels of ionizing radiation and exposes the patient to such radiation. Another option is a Cone-beam CT machine, which is available in some operation rooms and is somewhat easier to operate but is expensive and like the CT only provides blind navigation between scans, requires multiple iterations for navigation and requires the staff to leave the room. In addition, a CT-based imaging system is extremely costly, and in many cases not available in the same location as the location where a procedure is carried out.

Hence, an imaging technology, which uses standard fluoroscope devices, to reconstruct local three-dimensional volume in order to visualize and facilitate navigation to in-vivo targets, and to small soft-tissue objects in particular, has been introduced: US Patent Application No. 2017/035379 to Weingarten et al. entitled SYSTEMS AND METHODS FOR LOCAL THREE DIMENSIONAL VOLUME RECONSTRUCTION USING A STANDARD FLUOROSCOPE, the contents of which are incorporated herein by reference, US Patent Application No. 2017/035380 to Barak et al. entitled SYSTEM AND METHOD FOR NAVIGATING TO TARGET AND PERFORMING PROCEDURE ON TARGET UTILIZING FLUOROSCOPIC-BASED LOCAL THREE DIMENSIONAL VOLUME RECONSTRUCTION, the contents of which are incorporated herein by reference and U.S. patent application Ser. No. 15/892,053 to Weingarten et al. entitled SYSTEMS AND METHODS FOR LOCAL THREE DIMENSIONAL VOLUME RECONSTRUCTION USING A STANDARD FLUOROSCOPE, the contents of which are incorporated herein by reference.

In general, according to the systems and methods disclosed in the above-mentioned patent applications, a standard fluoroscope c-arm can be rotated, e.g., about 30 degrees, around a patient during a medical procedure, and a fluoroscopic 3D reconstruction of the region of interest is generated by a specialized software algorithm. The user can then scroll through the image slices of the fluoroscopic 3D reconstruction using the software interface to identify the target (e.g., a lesion) and mark it.

Such quick generation of a 3D reconstruction of a region of interest can provide real-time three-dimensional imaging of the target area. Real-time imaging of the target and medical devices positioned in its area may benefit numerous interventional procedures, such as biopsy and ablation procedures in various organs, vascular interventions and orthopedic surgeries. For example, when navigational bronchoscopy is concerned, the aim may be to receive accurate information about the position of a biopsy catheter relative to a target lesion.

As another example, minimally invasive procedures, such as laparoscopy procedures, including robotic-assisted surgery, may employ intraoperative fluoroscopy to increase visualization, e.g., for guidance and lesion locating, and to prevent unnecessary injury and complications. Employing the above-mentioned systems and methods for real-time reconstruction of fluoroscopic three-dimensional imaging of a target area and for navigation based on the reconstruction may benefit such procedures as well.

Still, it may not be an easy task to accurately identify and mark a target in the fluoroscopic 3D reconstruction, in particular when the target is a small soft-tissue. Thus, there is a need for systems and methods for facilitating the identification and marking of a target in fluoroscopic image data, and in a fluoroscopic 3D reconstruction in particular, to consequently facilitate the navigation to the target and the yield of pertinent medical procedures.

SUMMARY

There is provided in accordance with the present disclosure, a system for facilitating identification and marking of a target in a fluoroscopic image of a body region of a patient, the system comprising: (i) one or more storage devices having stored thereon instructions for: receiving a CT scan and a fluoroscopic 3D reconstruction of the body region of the patient, wherein the CT scan includes a marking of the target; generating at least one virtual fluoroscopy image based on the CT scan of the patient, wherein the virtual fluoroscopy image includes the target and the marking of the target, (ii) at least one hardware processor configured to execute said instructions, and (iii) a display configured to display to a user the virtual fluoroscopy image simultaneously with the fluoroscopic 3D reconstruction.

There is further provided in accordance with the present disclosure, a system for facilitating identification and marking of a target in a fluoroscopic image of a body region of a patient, the system comprising: (i) one or more storage devices having stored thereon instructions for: receiving a CT scan and a fluoroscopic 3D reconstruction of the body region of the patient, wherein the CT scan includes a marking of the target; generating at least one virtual fluoroscopy image based on the CT scan of the patient, wherein the virtual fluoroscopy image includes the target and the marking of the target, (ii) at least one hardware processor configured to execute said instructions, and (iii) a display configured to display to a user the virtual fluoroscopy image and the fluoroscopic 3D reconstruction.

There is further provided in accordance with the present disclosure, a method for identifying and marking a target in an image of a body region of a patient, the method comprising using at least one hardware processor for: receiving a CT scan and a fluoroscopic 3D reconstruction of the body region of the patient, wherein the CT scan includes a marking of the target; generating at least one virtual fluoroscopy image based on the CT scan of the patient, wherein the at least one virtual fluoroscopy image includes the target and the marking of the target; and displaying to a user the at least one virtual fluoroscopy image simultaneously with the fluoroscopic 3D reconstruction on a display, thereby facilitating the identification of the target in the fluoroscopic 3D reconstruction by the user.

There is further provided in accordance with the present disclosure, a method for identifying and marking a target in an image of a body region of a patient, the method comprising using at least one hardware processor for: receiving a CT scan and a fluoroscopic 3D reconstruction of the body region of the patient, wherein the CT scan includes a marking of the target; generating at least one virtual fluoroscopy image based on the CT scan of the patient, wherein the at least one virtual fluoroscopy image includes the target and the marking of the target; and displaying to a user the at least one virtual fluoroscopy image and the fluoroscopic 3D reconstruction on a display, thereby facilitating the identification of the target in the fluoroscopic 3D reconstruction by the user.

There is further provided in accordance with the present disclosure, a system for navigating to a target area within a patient's body during a medical procedure using real-time two-dimensional fluoroscopic images, the system comprising: a medical device configured to be navigated to the target area; a fluoroscopic imaging device configured to acquire a sequence of 2D fluoroscopic images of the target area about a plurality of angles relative to the target area, while the medical device is positioned in the target area; and a computing device configured to: receive a pre-operative CT scan of the target area, wherein the pre-operative CT scan includes a marking of the target; generate at least one virtual fluoroscopy image based on the pre-operative CT scan, wherein the at least one virtual fluoroscopy image includes the target and the marking of the target; generate a three-dimensional reconstruction of the target area based on the acquired sequence of 2D fluoroscopic images; display to a user the at least one virtual fluoroscopy image and the fluoroscopic 3D reconstruction simultaneously, receive a selection of the target from the fluoroscopic 3D reconstruction via the user; receive a selection of the medical device from the three-dimensional reconstruction or the sequence of 2D fluoroscopic images; and determine an offset of the medical device with respect to the target based on the selections of the target and the medical device.

There is further provided in accordance with the present disclosure, a system for navigating to a target area within a patient's body during a medical procedure using real-time two-dimensional fluoroscopic images, the system comprising: a medical device configured to be navigated to the target area; a fluoroscopic imaging device configured to acquire a sequence of 2D fluoroscopic images of the target area about a plurality of angles relative to the target area, while the medical device is positioned in the target area; and a computing device configured to: receive a pre-operative CT scan of the target area, wherein the pre-operative CT scan includes a marking of the target; generate at least one virtual fluoroscopy image based on the pre-operative CT scan, wherein the at least one virtual fluoroscopy image includes the target and the marking of the target; generate a three-dimensional reconstruction of the target area based on the acquired sequence of 2D fluoroscopic images; display to a user the at least one virtual fluoroscopy image and the fluoroscopic 3D reconstruction, receive a selection of the target from the fluoroscopic 3D reconstruction via the user; receive a selection of the medical device from the three-dimensional reconstruction or the sequence of 2D fluoroscopic images; and determine an offset of the medical device with respect to the target based on the selections of the target and the medical device.

There is further provided in accordance with the present disclosure, a method for navigating to a target area within a patient's body during a medical procedure using real-time two-dimensional fluoroscopic images, the method comprising using at least one hardware processor for: receiving a pre-operative CT scan of the target area, wherein the pre-operative CT scan includes a marking of the target; generating at least one virtual fluoroscopy image based on the pre-operative CT scan, wherein the at least one virtual fluoroscopy image includes the target and the marking of the target; receiving a sequence of 2D fluoroscopic images of the target area acquired in real-time about a plurality of angles relative to the target area, while a medical device is positioned in the target area; generating a three-dimensional reconstruction of the target area based on the sequence of 2D fluoroscopic images; displaying to a user the at least one virtual fluoroscopy image and the fluoroscopic 3D reconstruction simultaneously, receiving a selection of the target from the fluoroscopic 3D reconstruction via the user; receiving a selection of the medical device from the three-dimensional reconstruction or the sequence of 2D fluoroscopic images; and determining an offset of the medical device with respect to the target based on the selections of the target and the medical device.

There is further provided in accordance with the present disclosure, a method for navigating to a target area within a patient's body during a medical procedure using real-time two-dimensional fluoroscopic images, the method comprising using at least one hardware processor for: receiving a pre-operative CT scan of the target area, wherein the pre-operative CT scan includes a marking of the target; generating at least one virtual fluoroscopy image based on the pre-operative CT scan, wherein the at least one virtual fluoroscopy image includes the target and the marking of the target; receiving a sequence of 2D fluoroscopic images of the target area acquired in real-time about a plurality of angles relative to the target area, while a medical device is positioned in the target area; generating a three-dimensional reconstruction of the target area based on the sequence of 2D fluoroscopic images; displaying to a user the at least one virtual fluoroscopy image and the fluoroscopic 3D reconstruction, receiving a selection of the target from the fluoroscopic 3D reconstruction via the user; receiving a selection of the medical device from the three-dimensional reconstruction or the sequence of 2D fluoroscopic images; and determining an offset of the medical device with respect to the target based on the selections of the target and the medical device.

There is further provided in accordance with the present disclosure, a computer program product comprising a non-transitory computer-readable storage medium having program code embodied therewith, the program code executable by at least one hardware processor to: receive a pre-operative CT scan of the target area, wherein the pre-operative CT scan includes a marking of the target; generate at least one virtual fluoroscopy image based on the pre-operative CT scan, wherein the at least one virtual fluoroscopy image includes the target and the marking of the target; receive a sequence of 2D fluoroscopic images of the target area acquired in real-time about a plurality of angles relative to the target area, while a medical device is positioned in the target area; generate a fluoroscopic three-dimensional reconstruction of the target area based on the sequence of 2D fluoroscopic images; display to a user the at least one virtual fluoroscopy image and the fluoroscopic three-dimensional reconstruction simultaneously, receive a selection of the target from the fluoroscopic three-dimensional reconstruction via the user; receive a selection of the medical device from the fluoroscopic three-dimensional reconstruction or the sequence of 2D fluoroscopic images; and determine an offset of the medical device with respect to the target based on the selections of the target and the medical device.

There is further provided in accordance with the present disclosure, a computer program product comprising a non-transitory computer-readable storage medium having program code embodied therewith, the program code executable by at least one hardware processor to: receive a pre-operative CT scan of the target area, wherein the pre-operative CT scan includes a marking of the target; generate at least one virtual fluoroscopy image based on the pre-operative CT scan, wherein the at least one virtual fluoroscopy image includes the target and the marking of the target; receive a sequence of 2D fluoroscopic images of the target area acquired in real-time about a plurality of angles relative to the target area, while a medical device is positioned in the target area; generate a fluoroscopic three-dimensional reconstruction of the target area based on the sequence of 2D fluoroscopic images; display to a user the at least one virtual fluoroscopy image and the fluoroscopic three-dimensional reconstruction, receive a selection of the target from the fluoroscopic three-dimensional reconstruction via the user; receive a selection of the medical device from the fluoroscopic three-dimensional reconstruction or the sequence of 2D fluoroscopic images; and determine an offset of the medical device with respect to the target based on the selections of the target and the medical device.

In another aspect of the present disclosure, the one or more storage devices have stored thereon further instructions for directing the user to identify and mark the target in the fluoroscopic 3D reconstruction.

In another aspect of the present disclosure, the one or more storage devices have stored thereon further instructions for directing the user to identify and mark the target in the fluoroscopic 3D reconstruction while using the virtual fluoroscopy image as a reference.

In another aspect of the present disclosure, the one or more storage devices have stored thereon further instructions for directing the user to identify and mark the target in two fluoroscopic slice images of the fluoroscopic 3D reconstruction captured at two different angles.

In another aspect of the present disclosure, the generating of the at least one virtual fluoroscopy image is based on Digitally Reconstructed Radiograph techniques.

In another aspect of the present disclosure, the generating of the at least one virtual fluoroscopy image comprises: generating virtual fluoroscope poses around the target by simulating a fluoroscope trajectory while scanning the target; generating virtual 2D fluoroscopic images by projecting the CT scan volume according to the virtual fluoroscope poses; generating virtual fluoroscopic 3D reconstruction based on the virtual 2D fluoroscopic images; and selecting a slice image from the virtual fluoroscopic 3D reconstruction which comprises the marking of the target.

In another aspect of the present disclosure, the target is a soft-tissue target.

In another aspect of the present disclosure, the receiving of the fluoroscopic 3D reconstruction of the body region comprises: receiving a sequence of 2D fluoroscopic images of the body region acquired about a plurality of angles relative to the body region and generating the fluoroscopic 3D reconstruction of the body region based on the sequence of 2D fluoroscopic images.

In another aspect of the present disclosure, the method further comprises using said at least one hardware processor for directing the user to identify and mark the target in the fluoroscopic 3D reconstruction.

In another aspect of the present disclosure, the method further comprises using said at least one hardware processor for directing the user to identify and mark the target in the fluoroscopic 3D reconstruction while using the at least one virtual fluoroscopy image as a reference.

In another aspect of the present disclosure, the method further comprises using said at least one hardware processor for instructing the user to identify and mark the target in two fluoroscopic slice images of the fluoroscopic 3D reconstruction captured at two different angles.

In another aspect of the present disclosure, the system further comprises: a tracking system configured to provide data indicating the location of the medical device within the patient's body; and a display, wherein the computing device is further configured to: determine the location of the medical device based on the data provided by the tracking system; display the target area and the location of the medical device with respect to the target on the display; and correct the display of the location of the medical device with respect to the target based on the determined offset between the medical device and the target.

In another aspect of the present disclosure, the computing device is further configured to: generate a 3D rendering of the target area based on the pre-operative CT scan, wherein the display of the target area comprises displaying the 3D rendering; and register the tracking system to the 3D rendering, wherein the correction of the location of the medical device with respect to the target comprises updating the registration between the tracking system and the 3D rendering.

In another aspect of the present disclosure, the tracking system comprises: a sensor; and an electromagnetic field generator configured to generate an electromagnetic field for determining a location of the sensor, wherein the medical device comprises a catheter guide assembly having the sensor disposed thereon, and the determining of the location of the medical device comprises determining the location of the sensor based on the generated electromagnetic field.

In another aspect of the present disclosure, the target area comprises at least a portion of the lungs and the medical device is configured to be navigated to the target area through the airways luminal network.

In another aspect of the present disclosure, the computing device is configured to receive the selection of the medical device by automatically detecting a portion of the medical device in the acquired sequence of 2D fluoroscopic images or three-dimensional reconstruction and receiving the user command either accepting or rejecting the detection.

In another aspect of the present disclosure, the computing device is further configured to estimate the pose of the fluoroscopic imaging device, while the fluoroscopic imaging device acquires each of at least a plurality of images of the sequence of 2D fluoroscopic images, and wherein the generating of the three-dimensional reconstruction of the target area is based on the pose estimation of the fluoroscopic imaging device.

In another aspect of the present disclosure, the system further comprises a structure of markers, wherein the fluoroscopic imaging device is configured to acquire a sequence of 2D fluoroscopic images of the target area and of the structure of markers, and wherein the estimation of the pose of the fluoroscopic imaging device while acquiring each image of the at least plurality of images is based on detection of a possible and most probable projection of the structure of markers, as a whole, on each image.

In another aspect of the present disclosure, the computing device is further configured to direct the user to identify and mark the target in the fluoroscopic 3D reconstruction while using the at least one virtual fluoroscopy image as a reference.

In another aspect of the present disclosure, the method further comprises using said at least one hardware processor for: determining the location of the medical device within the patient's body based on data provided by a tracking system; displaying the target area and the location of the medical device with respect to the target on a display; and correcting the display of the location of the medical device with respect to the target based on the determined offset between the medical device and the target.

In another aspect of the present disclosure, the method further comprises using said at least one hardware processor for: generating a 3D rendering of the target area based on the pre-operative CT scan, wherein the displaying of the target area comprises displaying the 3D rendering; and registering the tracking system to the 3D rendering, wherein the correcting of the location of the medical device with respect to the target comprises updating the registration between the tracking system and the 3D rendering.

In another aspect of the present disclosure, the receiving of the selection of the medical device comprises automatically detecting a portion of the medical device in the sequence of 2D fluoroscopic images or three-dimensional reconstruction and receiving the user command either accepting or rejecting the detection.

In another aspect of the present disclosure, the method further comprises using said at least one hardware processor for estimating the pose of the fluoroscopic imaging device while acquiring each of at least a plurality of images of the sequence of 2D fluoroscopic images, wherein the generating of the three-dimensional reconstruction of the target area is based on the pose estimation of the fluoroscopic imaging device.

In another aspect of the present disclosure, a structure of markers is placed with respect to the patient and the fluoroscopic imaging device such that each image of the at least plurality of images comprises a projection of at least a portion of the structure of markers, and wherein the estimating of the pose of the fluoroscopic imaging device while acquiring each image of the at least plurality of images is based on detection of a possible and most probable projection of the structure of markers as a whole on each image.

In another aspect of the present disclosure, the non-transitory computer-readable storage medium has further program code executable by the at least one hardware processor to: determine the location of the medical device within the patient's body based on data provided by a tracking system; display the target area and the location of the medical device with respect to the target on a display; and correct the display of the location of the medical device with respect to the target based on the determined offset between the medical device and the target.

Any of the above aspects and embodiments of the present disclosure may be combined without departing from the scope of the present disclosure.

BRIEF DESCRIPTION OF THE DRAWINGS

Various aspects and embodiments of the present disclosure are described hereinbelow with references to the drawings, wherein.

DETAILED DESCRIPTION

Figure 1:
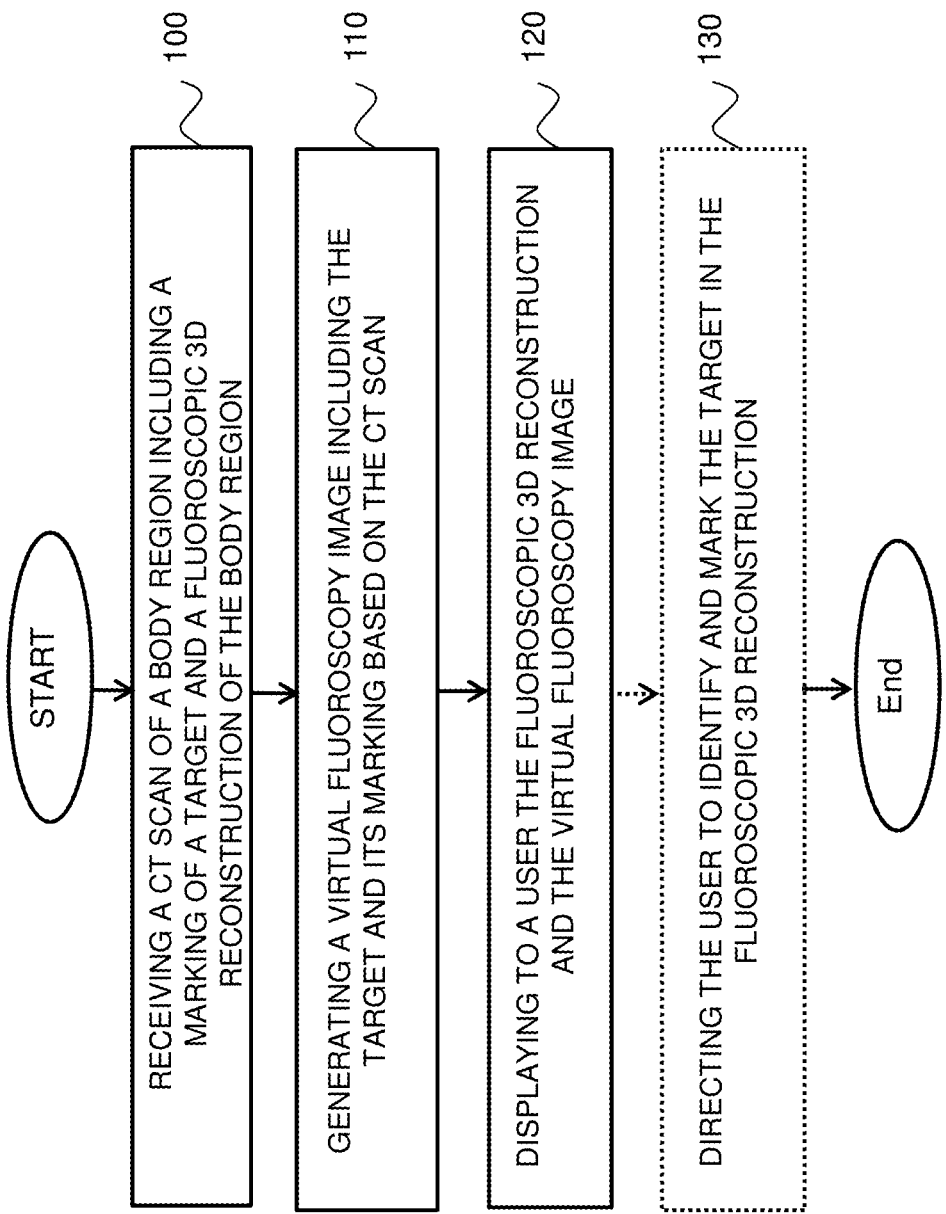
FIG. 1 is a flow chart of a method for identifying and marking a target in fluoroscopic 3D reconstruction in accordance with the present disclosure.

The term "target", as referred to herein, may relate to any element, biological or artificial, or to a region of interest in a patient's body, such as a tissue (including soft tissue and bone tissue), an organ, an implant or a fiducial marker.

The term "target area", as referred to herein, may relate to the target and at least a portion of its surrounding area. The term "target area" and the term "body region" may be used interchangeably when the term "body region" refers to the body region in which the target is located. Alternatively or in addition, the term "target area" may also refer to a portion of the body region in which the target is located, all according to the context.

The terms "and", "or" and "and/or" may be used interchangeably, while each term may incorporate the others, all according to the term's context.

The term "medical device", as referred to herein, may include, without limitation, optical systems, ultrasound probes, marker placement tools, biopsy tools, ablation tools (i.e., microwave ablation devices), laser probes, cryogenic probes, sensor probes, and aspirating needles.

The terms "fluoroscopic image" and "fluoroscopic images" may refer to a 2D fluoroscopic image/s and/or to a slice-image of any fluoroscopic 3D reconstructions, all in accordance with the term's context.

The terms "virtual fluoroscopic image" or "virtual fluoroscopic images" may refer to a virtual 2D fluoroscopic image/s and/or to a virtual fluoroscopy slice-image/s of a virtual fluoroscopic 3D reconstruction or any other 3D reconstruction, all in accordance with the term's context.

The present disclosure is directed to systems, methods and computer program products for facilitating the identification and marking of a target by a user in real-time fluoroscopic images of a body region of interest generated via a standard fluoroscope. Such real-time fluoroscopic images may include two-dimensional images and/or slice-images of a three-dimensional reconstruction. In particular, the identification and marking of the target in the real-time fluoroscopic data may be facilitated by using synthetic or virtual fluoroscopic data, which includes a marking or an indication of the target, as a reference. The virtual fluoroscopic data may be generated from previously acquired volumetric data and preferably such that it would imitate, as much as possible, fluoroscopic type of data. Typically, the target is better shown in the imaging modality of the previously acquired volumetric data than in the real-time fluoroscopic data.

The present disclosure is further directed to systems and methods for facilitating the navigation of a medical device to a target and/or its area using real-time two-dimensional fluoroscopic images of the target area. The navigation is facilitated by using local three-dimensional volumetric data, in which small soft-tissue objects are visible, constructed from a sequence of fluoroscopic images captured by a standard fluoroscopic imaging device available in most procedure rooms. The fluoroscopic-based constructed local three-dimensional volumetric data may be used to correct a location of a medical device with respect to a target or may be locally registered with previously acquired volumetric data. In general, the location of the medical device may be determined by a tracking system. The tracking system may be registered with the previously acquired volumetric data. A local registration of the real-time three-dimensional fluoroscopic data to the previously acquired volumetric data may be then performed via the tracking system. Such real-time data, may be used, for example, for guidance, navigation planning, improved navigation accuracy, navigation confirmation, and treatment confirmation.

Figure 3A:
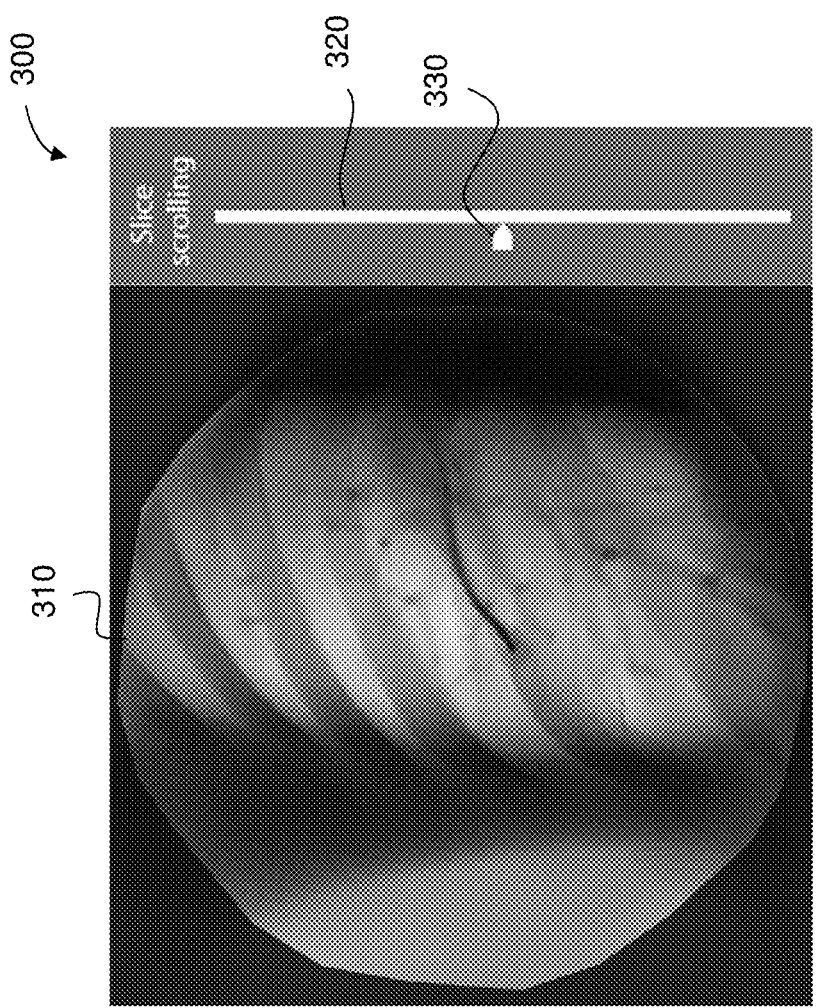
FIG. 3A is an exemplary screen shot showing a display of slice images of a fluoroscopic 3D reconstruction in accordance with the present disclosure.

Reference is now made to FIG. 1, which is a flow chart of a method for identifying and marking a target in a 3D fluoroscopic reconstruction in accordance with the present disclosure. In a step 100, a CT scan and a fluoroscopic 3D reconstruction of a body region of a patient may be received. The CT scan may include a marking or an indication of a target located in the patient's body region. Alternatively, a qualified medical professional may be directed to identify and mark the target in the CT scan. In some embodiments the target may be a soft-tissue target, such as a lesion. In some embodiments the imaged body region may include at least a portion of the lungs. In some embodiments, the 3D reconstructions may be displayed to the user. In some embodiments the 3D reconstruction may be displayed such that the user may scroll through its different slice images. Reference is now made to FIG. 3A, which is an exemplary screen shot 300 showing a display of slice images of a fluoroscopic 3D reconstruction in accordance with the present disclosure. Screen shot 300 includes a slice image 310, a scrolling bar 320 and an indicator 330. Scrolling bar 320 allows a user to scroll through the slice images of the fluoroscopic 3D reconstruction. Indicator 330 indicates the relative location of the slice image currently displayed, e.g., slice image 310, within the slice images constituting the fluoroscopic 3D reconstruction.

In some embodiments, the receiving of the fluoroscopic 3D reconstruction of the body region may include receiving a sequence of fluoroscopic images of the body region and generating the fluoroscopic 3D reconstruction of the body region based on at least a portion of the fluoroscopic images. In some embodiments, the method may further include directing a user to acquire the sequence of fluoroscopic images by manually sweeping the fluoroscope. In some embodiments, the method may further include automatically acquiring the sequence of fluoroscopic images. The fluoroscopic images may be acquired by a standard fluoroscope, in a continuous manner and about a plurality of angles relative to the body region. The fluoroscope may be swept manually, i.e., by a user, or automatically. For example, the fluoroscope may be swept along an angle of 20 to 45 degrees. In some embodiments, the fluoroscope may be swept along an angle of 30±5 degrees.

In some embodiments, the fluoroscopic 3D reconstruction may be generated based on tomosynthesis methods, and/or according to the systems and methods disclosed in US Patent Application No. 2017/035379 and U.S. patent application Ser. No. 15/892,053, as mentioned above and incorporated herein by reference. The CT scan may be generated according and via methods and systems as known in the art. The CT scan is a pre-operative CT scan, i.e., generated previously (i.e., not in real-time) and prior to a medical procedure for which the identification and marking of the target may be required.

In a step 110, at least one virtual fluoroscopy image may be generated based on the CT scan of the patient. The virtual fluoroscopy image can then include the target and the marking of the target, as indicated in the CT scan. The aim is to generate an image of the target, which includes a relatively accurate indication of the target, and which resembles the fluoroscopic type of images. A user may then use the indication of the target in the synthetic image to identify and mark the target in the real-time fluoroscopic volume (e.g., by identifying the target in one or more slice images). In some embodiments, the virtual fluoroscopy image may be of a type of 2D fluoroscopic image, e.g., a virtual 2D fluoroscopic image. In some embodiments, the virtual fluoroscopy image may be of a type of fluoroscopic 3D reconstruction slice image, e.g., a virtual slice image.

In some embodiments, the virtual 2D fluoroscopic image may be generated based on Digitally Reconstructed Radiograph techniques.

In some embodiments, the generation of the virtual fluoroscopy slice image may be generated according to the following steps. In a first step, the received CT volume is aligned with the fluoroscopic 3D reconstruction. In a second step, an estimation of a pose of the fluoroscopic device while capturing the set of fluoroscopic images used to generate the fluoroscopic 3D reconstruction in a selected position, e.g., in AP (anteroposterior) position, with respect to the target or patient is received or calculated. In a third step, a slice or slices of the CT scan volume perpendicular to the selected position and which include the target are generated. In a fourth step, the CT slice or slices are projected according to the estimated fluoroscope pose to receive a virtual fluoroscopy slice image.

In some embodiments, generation of a virtual fluoroscopy slice image of the target area may include the following steps. In a first step, virtual fluoroscope poses around the target may be obtained. In some embodiments, the virtual fluoroscope poses may be generated by simulating a fluoroscope trajectory while the fluoroscope scans the target. In some embodiments, the method may further include the generation of the 3D fluoroscopic reconstruction, as described with respect to step 430 of FIG. 4. The estimated poses of the fluoroscopic device while capturing the sequence of fluoroscopic images used to generate the fluoroscopic 3D reconstruction may be then utilized. In a second step, virtual fluoroscopic images may be generated by projecting the CT scan volume according to the virtual fluoroscope poses. In a third step, a virtual fluoroscopic 3D reconstruction may be generated based on the virtual fluoroscopic images. In some embodiments, the virtual fluoroscopic 3D reconstruction may be generated while using the method of reconstruction of the 3D fluoroscopic volume with adaptations. The resulting virtual fluoroscopic volume may then look more like the fluoroscopic volume. For example, the methods of fluoroscopic 3D reconstruction disclosed in US Patent Application No. 2017/035379, US Patent Application No. 2017/035380 and U.S. patent application Ser. No. 15/892,053, as detailed above and herein incorporated by reference, may be used. In a fourth step, a slice image which includes the indication of the target may be selected from the virtual fluoroscopic 3D reconstruction.

In some embodiments, when marking of the target in a slice image of a fluoroscopic 3D reconstruction is desired, generating and using a virtual slice image as a reference may be more advantageous. In some embodiments, when marking of the target in a fluoroscopic 2D image is desired, generating and using a virtual fluoroscopic 2D image may be more advantageous.

In a step 120, the virtual fluoroscopy image and the fluoroscopic 3D reconstruction may be displayed to a user. The indication of the target in the virtual fluoroscopy image may be then used as a reference for identifying and marking the target in slice images of the fluoroscopic 3D reconstruction. Thus, facilitating the identification and marking of the target in the fluoroscopic 3D reconstruction. The identification and marking of the target performed by the user may be then more accurate. A user may use the virtual fluoroscopy as a reference prior to the identification and marking of the target in the real-time fluoroscopic images and/or may use it after such identification and marking.

Figure 3B:
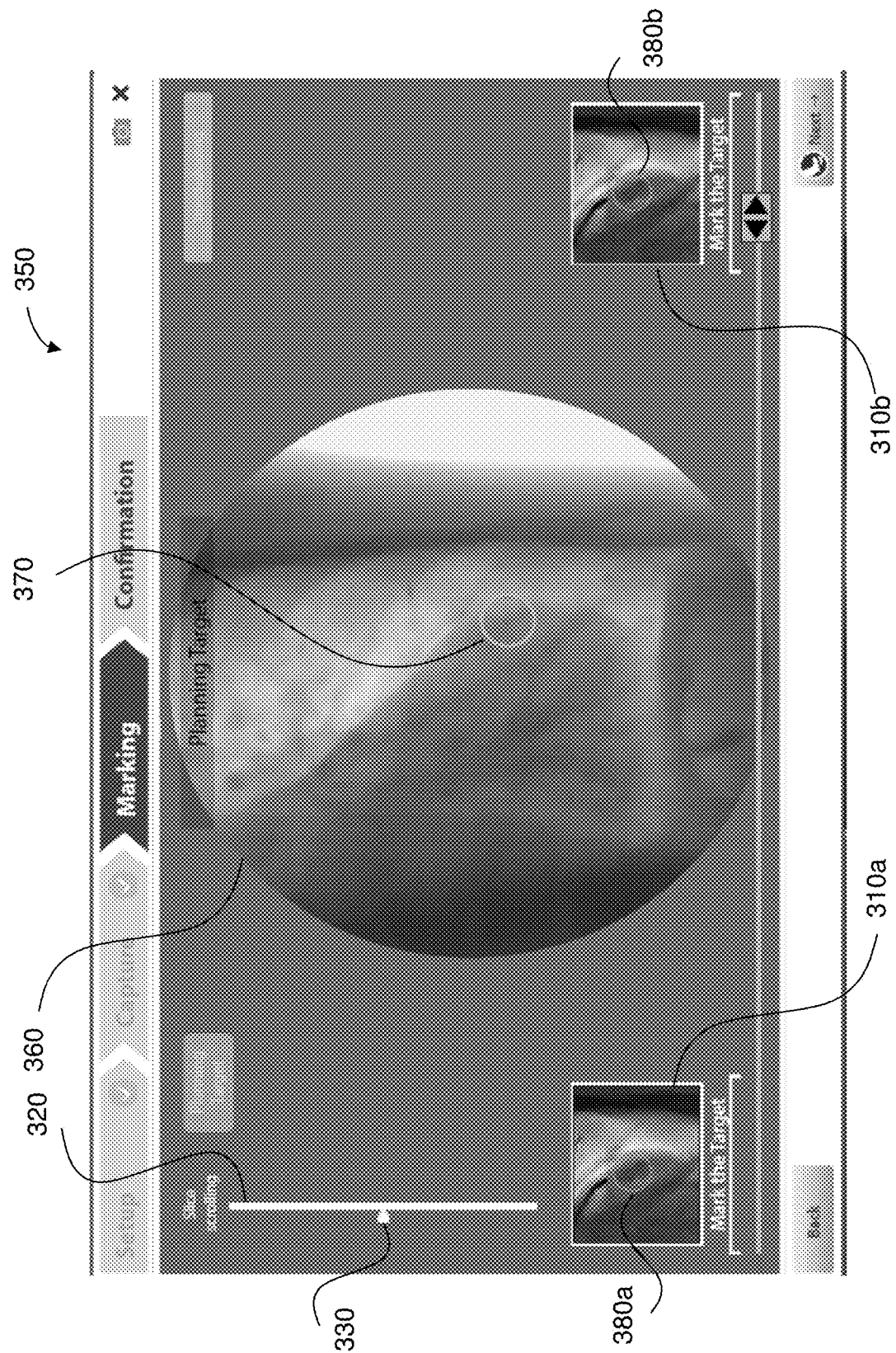
FIG. 3B is an exemplary screen shot showing a virtual fluoroscopy image presented simultaneously with slice images of a fluoroscopic 3D reconstruction in accordance with the present disclosure.

Various workflows and displays may be used to identify and mark the target while using virtual fluoroscopic data as a reference according to the present disclosure. Such displays are exemplified in FIGS. 3B and 3C. Reference is now made to FIG. 3B, which is an exemplary screen shot 350 showing a virtual fluoroscopy image 360 displayed simultaneously with fluoroscopic slice images 310a and 310b of a fluoroscopic 3D reconstruction in accordance with the present disclosure. Screen shot 350 includes a virtual fluoroscopy image 360, fluoroscopic slice images 310a and 310b, scroll bar 320 and indicator 330. Virtual fluoroscopy image 360 includes a circular marking 370 of a target. Fluoroscopic slice images 310a and 310b include circular markings 380a and 380b of the target correspondingly performed by a user. In some embodiments, the user may visually align between fluoroscopic slice images 310a and 310b and markings 380a and 380b and virtual fluoroscopic image 360 and marking 370 to verify markings 380a and 380b. In some embodiments, the user may use virtual fluoroscopic image 360 and marking 370 to mark fluoroscopic slice images 310a and 310b. In this specific example, two fluoroscopic slice images are displayed simultaneously. However, according to other embodiments, only one fluoroscopic slice image may be displayed or more than two. In this specific example, the virtual fluoroscopy image is displayed in the center of the screen and the fluoroscopic slice images are displayed in the bottom sides of the screen. However, any other display arrangement may be used.

Figure 3C:
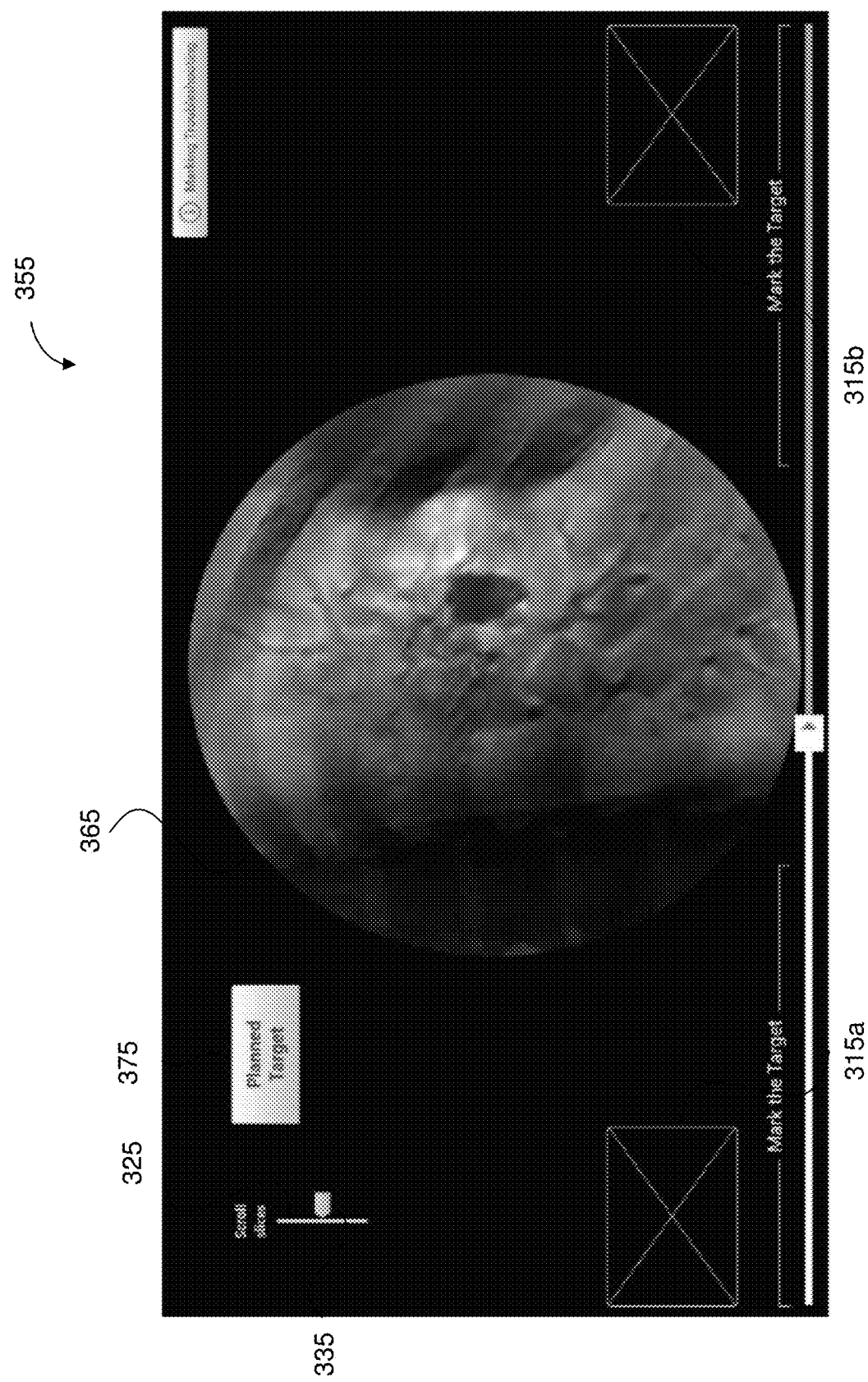
FIG. 3C is an exemplary screen shot showing a display of a fluoroscopic 3D reconstruction in accordance with the present disclosure.

Reference is now made to FIG. 3C, which is an exemplary screen shot 355 showing a display of at least a portion of a 3D fluoroscopic reconstruction 365. Screen shot 355 includes the 3D reconstruction image 365, which includes at least a portion (e.g., a slice) of the 3D fluoroscopic reconstruction; delimited areas 315a and 315b, scroll bar 325, indicator 335 and button 375. Delimited areas 315a and 315b are specified areas for presenting slice images of the portion of the 3D reconstruction presented in 3D reconstruction image 365 selected by the user (e.g., selected by marking the target in these slice images). Button 374 is captioned "Planned Target". In some embodiments, once the user press or click button 374, he is presented with at least one virtual fluoroscopic image showing the target and a marking of it to be used as reference. Once button 374 is pressed, the display may change. In some embodiments, the display presented once button 374 is pressed may include virtual fluoroscopy images only. In some embodiments, the display presented once button 374 is pressed may include additional images, including slice images of the 3D reconstruction. Scroll bar 325, and indicator 335 may be used by the user to scroll through slices of at least the portion of the 3D reconstruction presented in 3D reconstruction image 365.

In some embodiments, the virtual fluoroscopy image and the fluoroscopic 3D reconstruction (e.g., a selected slice of the fluoroscopic 3D reconstruction) may be displayed to a user simultaneously. In some embodiments, the virtual fluoroscopy image and the fluoroscopic 3D reconstruction may be displayed in a non-simultaneous manner. For example, the virtual fluoroscopy image may be displayed in a separate alternative screen or in a pop-up window.

In an optional step 130, the user may be directed to identify and mark the target in the fluoroscopic 3D reconstruction. In some embodiments, the user may be specifically directed to use the virtual fluoroscopy image/s as a reference. In some embodiments, the user may be instructed to identify and mark the target in two fluoroscopic slice images of the fluoroscopic 3D reconstruction captured at two different angles. Marking the target in two fluoroscopic slice images may be required when the slice width is relatively thick, and such that additional data would be required to accurately determine the location of the target in the fluoroscopic 3D reconstruction. In some embodiments, the user may need or may be required to only identify the target and may be directed accordingly. In some embodiments, the target may be automatically identified in the fluoroscopic 3D reconstruction by a dedicated algorithm. The user may be then required to confirm and optionally amend the automatic marking using the virtual fluoroscopy image as a reference.

In some embodiments, the identification and marking of a target may be performed in one or more two-dimensional fluoroscopic images, i.e., fluoroscopic images as originally captured. One or more fluoroscopic images may be then received and displayed to the user instead of the fluoroscopic 3D reconstruction. The identification and marking of the target by a user may be then performed with respect to the received one or more fluoroscopic images.

In some embodiments, the set of two-dimensional fluoroscopic images (e.g., as originally captured), which was used to construct the fluoroscopic 3D reconstruction, may be additionally received (e.g., in addition to the 3D fluoroscopic reconstruction). The fluoroscopic 3D reconstruction, the corresponding set of two-dimensional fluoroscopic images and the virtual fluoroscopy image may be displayed to the user. The user may then select if to identify and mark the target in one or more slice images of the fluoroscopic 3D reconstruction, one or more images of the two-dimensional fluoroscopic images or in both.

Figure 2:
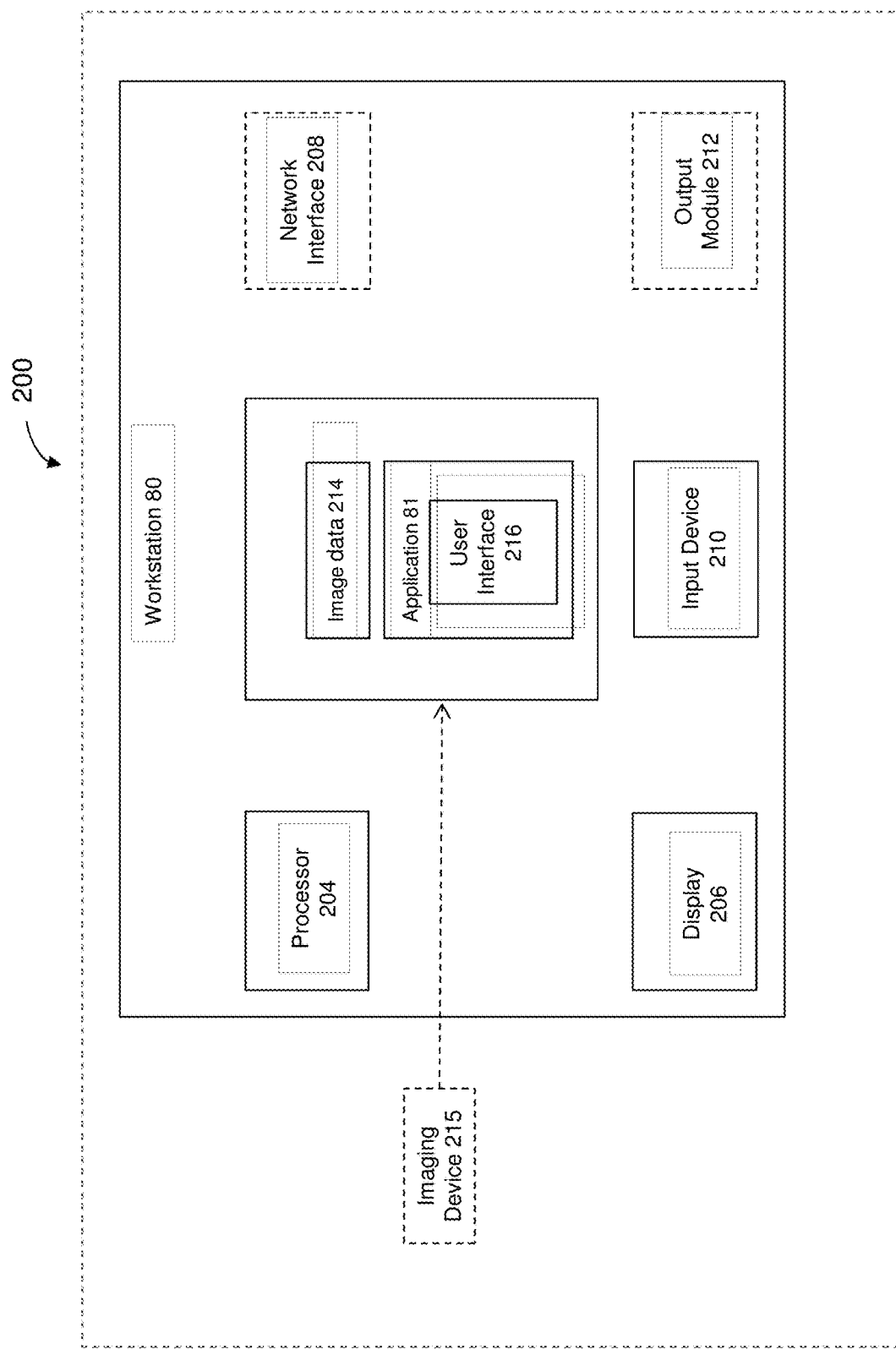
FIG. 2 is a schematic diagram of a system configured for use with the method of FIG. 1.

Reference is now made to FIG. 2, which is a schematic diagram of a system 200 configured for use with the method of FIG. 1. System 200 may include a workstation 80, and optionally a fluoroscopic imaging device or fluoroscope 215. In some embodiments, workstation 80 may be coupled with fluoroscope 215, directly or indirectly, e.g., by wireless communication. Workstation 80 may include a memory or storage device 202, a processor 204, a display 206 and an input device 210. Processor or hardware processor 204 may include one or more hardware processors. Workstation 80 may optionally include an output module 212 and a network interface 208. Memory 202 may store an application 81 and image data 214. Application 81 may include instructions executable by processor 204, inter alia, for executing the method steps of FIG. 1. Application 81 may further include a user interface 216. Image data 214 may include the CT scan, the fluoroscopic 3D reconstructions of the target area and/or any other fluoroscopic image data and/or the generated one or more virtual fluoroscopy images. Processor 204 may be coupled with memory 202, display 206, input device 210, output module 212, network interface 208 and fluoroscope 215. Workstation 80 may be a stationary computing device, such as a personal computer, or a portable computing device such as a tablet computer. Workstation 80 may embed a plurality of computer devices.

Memory 202 may include any non-transitory computer-readable storage media for storing data and/or software including instructions that are executable by processor 204 and which control the operation of workstation 80 and in some embodiments, may also control the operation of fluoroscope 215. Fluoroscope 215 may be used to capture a sequence of fluoroscopic images based on which the fluoroscopic 3D reconstruction is generated. In an embodiment, memory or storage device 202 may include one or more storage devices such as solid-state storage devices such as flash memory chips. Alternatively, or in addition to the one or more solid-state storage devices, memory 202 may include one or more mass storage devices connected to the processor 204 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 204. That is, computer readable storage media may include non-transitory, volatile and non-volatile, removable and non-removable media implemented in any method or technology for storage of information such as computer-readable instructions, data structures, program modules or other data. For example, computer-readable storage media may include RAM, ROM, EPROM, EEPROM, flash memory or other solid-state memory technology, CD-ROM, DVD, Blu-Ray or other optical storage, magnetic cassettes, magnetic tape, magnetic disk storage or other magnetic storage devices, or any other medium which may be used to store the desired information, and which may be accessed by workstation 80.

Application 81 may, when executed by processor 204, cause display 206 to present user interface 216. User interface 216 may be configured to present to the user the fluoroscopic 3D reconstruction and the generated virtual fluoroscopy image, as shown, for example, in FIGS. 3A and 3B. User interface 216 may be further configured to direct the user to identify and mark the target in the displayed fluoroscopic 3D reconstruction or any other fluoroscopic image data in accordance with the present disclosure.

Network interface 208 may be configured to connect to a network such as a local area network (LAN) consisting of a wired network and/or a wireless network, a wide area network (WAN), a wireless mobile network, a Bluetooth network, and/or the internet. Network interface 208 may be used to connect between workstation 80 and fluoroscope 215. Network interface 208 may be also used to receive image data 214. Input device 210 may be any device by means of which a user may interact with workstation 80, such as, for example, a mouse, keyboard, foot pedal, touch screen, and/or voice interface. Output module 212 may include any connectivity port or bus, such as, for example, parallel ports, serial ports, universal serial busses (USB), or any other similar connectivity port known to those skilled in the art.

Figure 4:
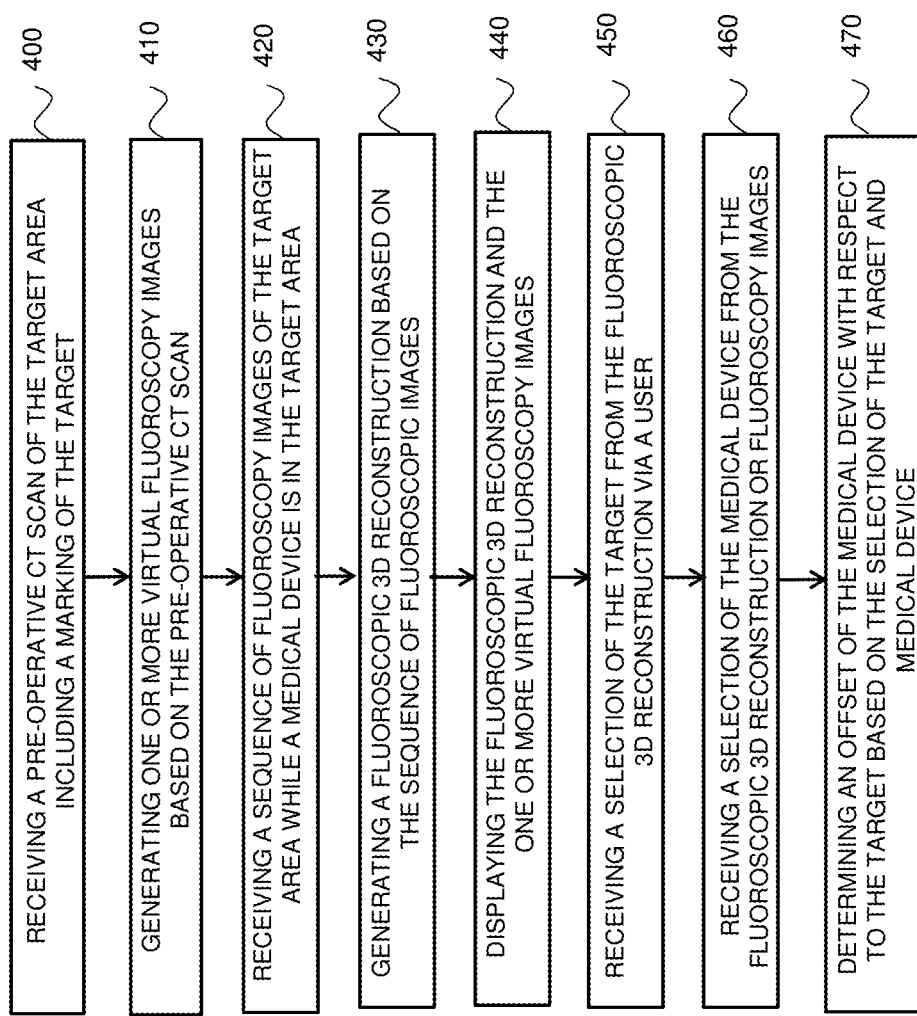
FIG. 4 is a flow chart of a method for navigating to a target using real-time two-dimensional fluoroscopic images in accordance with the present disclosure.

Reference is now made to FIG. 4, which is a flow chart of a method for navigating to a target using real-time two-dimensional fluoroscopic images in accordance with the present disclosure. The method facilitates navigating to a target area within a patient's body during a medical procedure. The method utilizes real-time fluoroscopic-based three-dimensional volumetric data. The fluoroscopic three-dimensional volumetric data may be generated from two-dimensional fluoroscopic images.

In a step 400, a pre-operative CT scan of the target area may be received. The pre-operative CT scan may include a marking or indication of the target. Step 400 may be similar to step 100 of the method of FIG. 1.

In a step 410, one or more virtual fluoroscopy images may be generated based on the pre-operative CT scan. The virtual fluoroscopy images may include the target and the marking or indication of the target. Step 400 may be similar to step 110 of the method of FIG. 1.

In a step 420, a sequence of fluoroscopic images of the target area acquired in real time about a plurality of angles relative to the target area may be received. The sequence of images may be captured while a medical device is positioned in the target area. In some embodiments, the method may include further steps for directing a user to acquire the sequence of fluoroscopic images. In some embodiments, the method may include one or more further steps for automatically acquiring the sequence of fluoroscopic images.

In a step 430, a three-dimensional reconstruction of the target area may be generated based on the sequence of fluoroscopic images.

In some embodiments, the method further comprises one or more steps for estimating the pose of the fluoroscopic imaging device while acquiring each of the fluoroscopic images, or at least a plurality of them. The three-dimensional reconstruction of the target area may be then generated based on the pose estimation of the fluoroscopic imaging device.

In some embodiments, a structure of markers may be placed with respect to the patient and the fluoroscopic imaging device, such that each fluoroscopic image includes a projection of at least a portion of the structure of markers. The estimation of the pose of the fluoroscopic imaging device while acquiring each image may be then facilitated by the projections of the structure of markers on the fluoroscopic images. In some embodiments, the estimation may be based on detection of a possible and most probable projection of the structure of markers as a whole on each image.

Exemplary systems and methods for constructing such fluoroscopic-based three-dimensional volumetric data are disclosed in the above commonly owned U.S. Patent Publication No. 2017/0035379, U.S. patent application Ser. No. 15/892,053 and U.S. Provisional Application Ser. No. 62/628,017, which are incorporated by reference.

In some embodiments, once the pose estimation process is complete, the projection of the structure of markers on the images may be removed by using well known methods. One such method is disclosed in commonly-owned U.S. Patent Application No. 62/628,028, entitled: "IMAGE RECONSTRUCTION SYSTEM AND METHOD", filed on Feb. 8, 2018, to Alexandroni et al., the entire content of which is hereby incorporated by reference.

In a step 440, one or more virtual fluoroscopy images and the fluoroscopic 3D reconstruction may be displayed to a user. The display may be according to step 120 of the method of FIG. 1 and as exemplified in FIG. 3B. In some embodiments, one or more virtual fluoroscopy images and the fluoroscopic 3D reconstruction may be displayed to a user simultaneously. In some embodiments, the virtual fluoroscopy image and the fluoroscopic 3D reconstruction may be displayed in a non-simultaneous manner. For example, the virtual fluoroscopy image may be displayed in a separate screen or may be displayed, e.g., upon the user's request, instead of the display of the fluoroscopic 3D reconstruction.

In a step 450, a selection of the target from the fluoroscopic 3D reconstruction may be received via the user. In some embodiments, the user may be directed to identify and mark the target in the fluoroscopic 3D reconstruction while using the one or more virtual fluoroscopy images as a reference.

In a step 460, a selection of the medical device from the three-dimensional reconstruction or the sequence of fluoroscopic images may be received. In some embodiments, the receipt of the selection may include automatically detecting at least a portion of the medical device in the sequence of fluoroscopic images or three-dimensional reconstruction. In some embodiments, a user command either accepting or rejecting the detection may be also received. In some embodiments the selection may be received via the user. Exemplary automatic detection of a catheter in fluoroscopic images is disclosed in commonly-owned U.S. Provisional Application No. 62/627,911 to Weingarten et al., entitled "System And Method For Catheter Detection In Fluoroscopic Images And Updating Displayed Position Of Catheter", the contents of which are incorporated herein by reference.

In a step 470, an offset of the medical device with respect to the target may be determined. The determination of the offset may be based on the received selections of the target and the medical device.

In some embodiments, the method may further include a step for determining the location of the medical device within the patient's body based on data provided by a tracking system, such as an electromagnetic tracking system. In a further step, the target area and the location of the medical device with respect to the target may be displayed to the user on a display. In another step, the display of the location of the medical device with respect to the target may be corrected based on the determined offset between the medical device and the target.

In some embodiments, the method may further include a step for generating a 3D rendering of the target area based on the pre-operative CT scan. A display of the target area may then include a display of the 3D rendering. In another step, the tracking system may be registered with the 3D rendering. A correction of the location of the medical device with respect to the target based on the determined offset may then include the local updating of the registration between the tracking system and the 3D rendering in the target area. In some embodiments, the method may further include a step for registering the fluoroscopic 3D reconstruction to the tracking system. In another step and based on the above, a local registration between the fluoroscopic 3D reconstruction and the 3D rendering may be performed in the target area.

In some embodiments, the target may be a soft tissue target. In some embodiments, the target area may include at least a portion of the lungs and the medical device may be configured to be navigated to the target area through the airways luminal network.

In some embodiments, the method may include receiving a selection of the target from one or more images of the sequence of fluoroscopy images in addition or alternatively to receiving a selection of the target from the fluoroscopic 3D reconstruction. The sequence of fluoroscopy images may be then displayed to the user in addition or instead of the display of the fluoroscopic 3D reconstruction correspondingly. The method of FIG. 4 should be then adapted accordingly.

A computer program product for navigating to a target using real-time two-dimensional fluoroscopic images is herein disclosed. The computer program product may include a non-transitory computer-readable storage medium having program code embodied therewith. The program code may be executable by at least one hardware processor to perform the steps of the method of FIG. 1 and/or FIG. 4.

Figure 5:
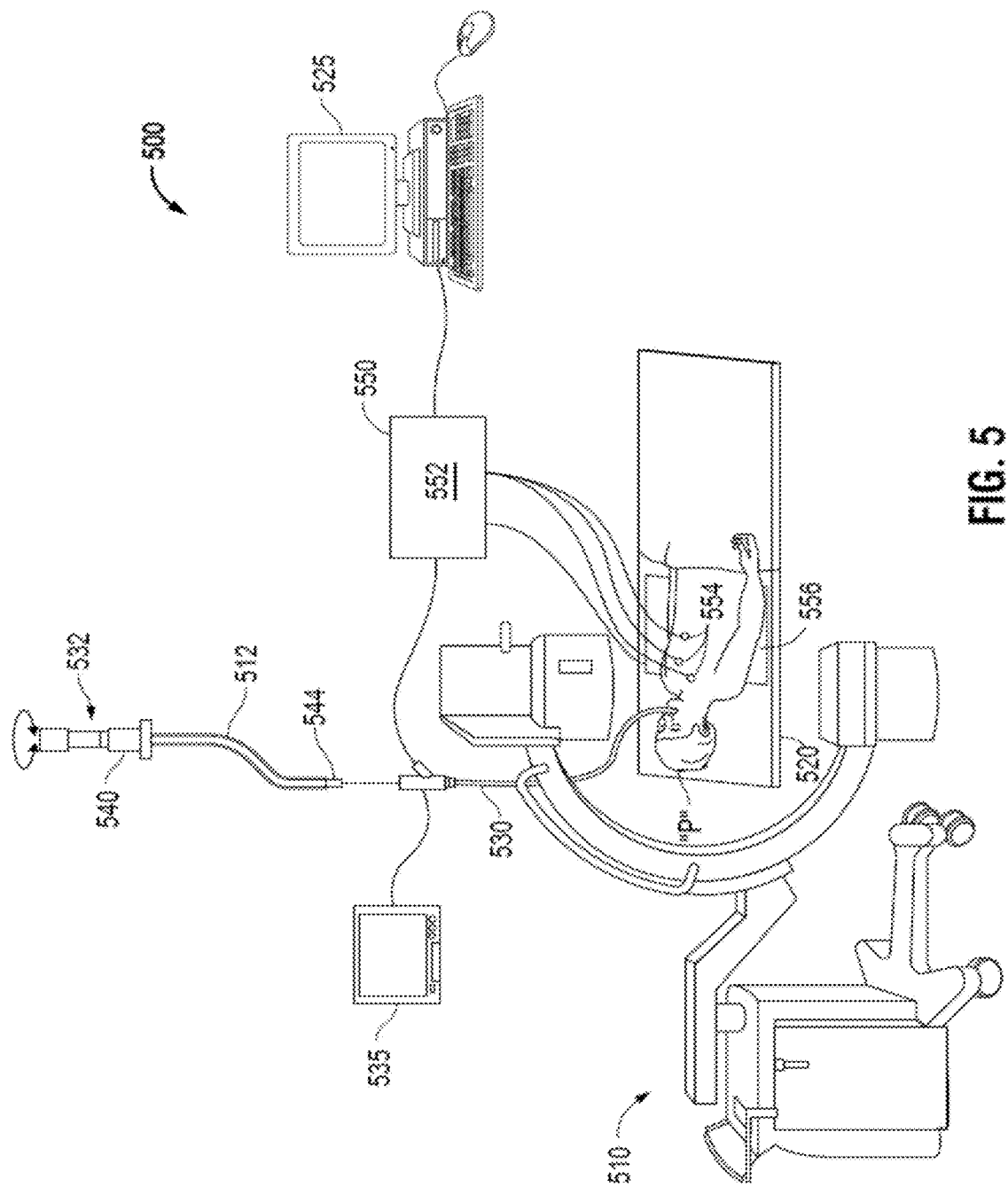
FIG. 5 is a perspective view of one illustrative embodiment of an exemplary system for navigating to a soft-tissue target via the airways network in accordance with the method of FIG. 4.

FIG. 5 is a perspective view of one illustrative embodiment of an exemplary system for facilitating navigation to a soft-tissue target via the airways network in accordance with the method of FIG. 4. System 500 may be further configured to construct fluoroscopic-based three-dimensional volumetric data of the target area from 2D fluoroscopic images. System 500 may be further configured to facilitate approach of a medical device to the target area by using Electromagnetic Navigation Bronchoscopy (ENB) and for determining the location of a medical device with respect to the target.

System 500 may be configured for reviewing CT image data to identify one or more targets, planning a pathway to an identified target (planning phase), navigating an extended working channel (EWC) 512 of a catheter assembly to a target (navigation phase) via a user interface, and confirming placement of EWC 512 relative to the target. One such EMN system is the ELECTROMAGNETIC NAVIGATION BRONCHOSCOPY® system currently sold by Medtronic PLC. The target may be tissue of interest identified by review of the CT image data during the planning phase. Following navigation, a medical device, such as a biopsy tool or other tool, may be inserted into EWC 512 to obtain a tissue sample from the tissue located at, or proximate to, the target.

As shown in FIG. 5, EWC 512 is part of a catheter guide assembly 540. In practice, EWC 512 is inserted into a bronchoscope 530 for access to a luminal network of the patient "P." Specifically, EWC 512 of catheter guide assembly 540 may be inserted into a working channel of bronchoscope 530 for navigation through a patient's luminal network. A locatable guide (LG) 532, including a sensor 544 is inserted into EWC 512 and locked into position such that sensor 544 extends a desired distance beyond the distal tip of EWC 512. The position and orientation of sensor 544 relative to the reference coordinate system, and thus the distal portion of EWC 512, within an electromagnetic field can be derived. Catheter guide assemblies 540 are currently marketed and sold by Medtronic PLC under the brand names SUPERDIMENSION® Procedure Kits, or EDGE™ Procedure Kits, and are contemplated as useable with the present disclosure. For a more detailed description of catheter guide assemblies 540, reference is made to commonly-owned U.S. Patent Publication No. 2014/0046315, filed on Mar. 15, 2013, by Ladtkow et al, U.S. Pat. Nos. 7,233,820, and 9,044,254, the entire contents of each of which are hereby incorporated by reference.

System 500 generally includes an operating table 520 configured to support a patient "P," a bronchoscope 530 configured for insertion through the patient's "P's" mouth into the patient's "P's" airways; monitoring equipment 535 coupled to bronchoscope 530 (e.g., a video display, for displaying the video images received from the video imaging system of bronchoscope 530); a locating or tracking system 550 including a locating module 552, a plurality of reference sensors 554 and a transmitter mat coupled to a structure of markers 556; and a computing device 525 including software and/or hardware used to facilitate identification of a target, pathway planning to the target, navigation of a medical device to the target, and/or confirmation and/or determination of placement of EWC 512, or a suitable device therethrough, relative to the target. Computing device 525 may be similar to workstation 80 of FIG. 2 and may be configured, inter alia, to execute the methods of FIG. 1 and FIG. 4.

A fluoroscopic imaging device 510 capable of acquiring fluoroscopic or x-ray images or video of the patient "P" is also included in this particular aspect of system 500. The images, sequence of images, or video captured by fluoroscopic imaging device 510 may be stored within fluoroscopic imaging device 510 or transmitted to computing device 525 for storage, processing, and display, e.g., as described with respect to FIG. 2. Additionally, fluoroscopic imaging device 510 may move relative to the patient "P" so that images may be acquired from different angles or perspectives relative to patient "P" to create a sequence of fluoroscopic images, such as a fluoroscopic video. The pose of fluoroscopic imaging device 510 relative to patient "P" and while capturing the images may be estimated via structure of markers 556 and according to the method of FIG. 4. The structure of markers is positioned under patient "P", between patient "P" and operating table 520 and may be positioned between patient "P" and a radiation source or a sensing unit of fluoroscopic imaging device 510. The structure of markers is coupled to the transmitter mat (both indicated 556) and positioned under patient "P" on operating table 520. Structure of markers and transmitter map 556 are positioned under the target area within the patient in a stationary manner. Structure of markers and transmitter map 556 may be two separate elements which may be coupled in a fixed manner or alternatively may be manufactured as a single unit. Fluoroscopic imaging device 510 may include a single imaging device or more than one imaging device. In embodiments including multiple imaging devices, each imaging device may be a different type of imaging device or the same type. Further details regarding the imaging device 510 are described in U.S. Pat. No. 8,565,858, which is incorporated by reference in its entirety herein.

Computing device 525 may be any suitable computing device including a processor and storage medium, wherein the processor is capable of executing instructions stored on the storage medium. Computing device 525 may further include a database configured to store patient data, CT data sets including CT images, fluoroscopic data sets including fluoroscopic images and video, fluoroscopic 3D reconstruction, navigation plans, and any other such data. Although not explicitly illustrated, computing device 525 may include inputs, or may otherwise be configured to receive, CT data sets, fluoroscopic images/video and other data described herein. Additionally, computing device 525 includes a display configured to display graphical user interfaces. Computing device 525 may be connected to one or more networks through which one or more databases may be accessed.

With respect to the planning phase, computing device 525 utilizes previously acquired CT image data for generating and viewing a three-dimensional model or rendering of the patient's "P's" airways, enables the identification of a target on the three-dimensional model (automatically, semi-automatically, or manually), and allows for determining a pathway through the patient's "P's" airways to tissue located at and around the target. More specifically, CT images acquired from previous CT scans are processed and assembled into a three-dimensional CT volume, which is then utilized to generate a three-dimensional model of the patient's "P's" airways. The three-dimensional model may be displayed on a display associated with computing device 525, or in any other suitable fashion. Using computing device 525, various views of the three-dimensional model or enhanced two-dimensional images generated from the three-dimensional model are presented. The enhanced two-dimensional images may possess some three-dimensional capabilities because they are generated from three-dimensional data. The three-dimensional model may be manipulated to facilitate identification of target on the three-dimensional model or two-dimensional images, and selection of a suitable pathway through the patient's "P's" airways to access tissue located at the target can be made. Once selected, the pathway plan, three-dimensional model, and images derived therefrom, can be saved and exported to a navigation system for use during the navigation phase(s). One such planning software is the ILOGIC® planning suite currently sold by Medtronic PLC.

With respect to the navigation phase, a six degrees-of-freedom electromagnetic locating or tracking system 550, e.g., similar to those disclosed in U.S. Pat. Nos. 8,467,589, 6,188,355, and published PCT Application Nos. WO 00/10456 and WO 01/67035, the entire contents of each of which are incorporated herein by reference, or other suitable system for determining location, is utilized for performing registration of the images and the pathway for navigation, although other configurations are also contemplated. Tracking system 550 includes a locating or tracking module 552, a plurality of reference sensors 554, and a transmitter mat 556 (coupled with the structure of markers). Tracking system 550 is configured for use with a locatable guide 532 and particularly sensor 544. As described above, locatable guide 532 and sensor 544 are configured for insertion through EWC 512 into a patient's "P's" airways (either with or without bronchoscope 530) and are selectively lockable relative to one another via a locking mechanism.

Transmitter mat 556 is positioned beneath patient "P." Transmitter mat 556 generates an electromagnetic field around at least a portion of the patient "P" within which the position of a plurality of reference sensors 554 and the sensor element 544 can be determined with use of a tracking module 552. One or more of reference sensors 554 are attached to the chest of the patient "P." The six degrees of freedom coordinates of reference sensors 554 are sent to computing device 525 (which includes the appropriate software) where they are used to calculate a patient coordinate frame of reference. Registration is generally performed to coordinate locations of the three-dimensional model and two-dimensional images from the planning phase, with the patient's "P's" airways as observed through the bronchoscope 530, and allow for the navigation phase to be undertaken with precise knowledge of the location of the sensor 544, even in portions of the airway where the bronchoscope 530 cannot reach. Further details of such a registration technique and their implementation in luminal navigation can be found in U.S. Patent Application Pub. No. 2011/0085720, the entire content of which is incorporated herein by reference, although other suitable techniques are also contemplated.

Registration of the patient's "P's" location on the transmitter mat 556 is performed by moving LG 532 through the airways of the patient's "P." More specifically, data pertaining to locations of sensor 544, while locatable guide 532 is moving through the airways, is recorded using transmitter mat 556, reference sensors 554, and tracking module 552. A shape resulting from this location data is compared to an interior geometry of passages of the three-dimensional model generated in the planning phase, and a location correlation between the shape and the three-dimensional model based on the comparison is determined, e.g., utilizing the software on computing device 525. In addition, the software identifies non-tissue space (e.g., air filled cavities) in the three-dimensional model. The software aligns, or registers, an image representing a location of sensor 544 with the three-dimensional model and/or two-dimensional images generated from the three-dimension model, which are based on the recorded location data and an assumption that locatable guide 532 remains located in non-tissue space in the patient's "P's" airways. Alternatively, a manual registration technique may be employed by navigating the bronchoscope 530 with the sensor 544 to pre-specified locations in the lungs of the patient "P", and manually correlating the images from the bronchoscope to the model data of the three-dimensional model.

Following registration of the patient "P" to the image data and pathway plan, a user interface is displayed in the navigation software which sets for the pathway that the clinician is to follow to reach the target. One such navigation software is the ILOGIC® navigation suite currently sold by Medtronic PLC.

Once EWC 512 has been successfully navigated proximate the target as depicted on the user interface, the locatable guide 532 may be unlocked from EWC 512 and removed, leaving EWC 512 in place as a guide channel for guiding medical devices including without limitation, optical systems, ultrasound probes, marker placement tools, biopsy tools, ablation tools (i.e., microwave ablation devices), laser probes, cryogenic probes, sensor probes, and aspirating needles to the target.

A medical device may be then inserted through EWC 512 and navigated to the target or to a specific area adjacent to the target. A sequence of fluoroscopic images may be then acquired via fluoroscopic imaging device 510, optionally by a user and according to directions displayed via computing device 525. A fluoroscopic 3D reconstruction may be then generated via computing device 525. The generation of the fluoroscopic 3D reconstruction is based on the sequence of fluoroscopic images and the projections of structure of markers 556 on the sequence of images. One or more virtual fluoroscopic images may be then generated based on the pre-operative CT scan and via computing device 525. The one or more virtual fluoroscopic images and the fluoroscopic 3D reconstruction may be then displayed to the user on a display via computing device 525, optionally simultaneously. The user may be then directed to identify and mark the target while using the virtual fluoroscopic image as a reference. The user may be also directed to identify and mark the medical device in the sequence of fluoroscopic 2D-dimensional images. An offset between the location of the target and the medical device may be then determined or calculated via computer device 525. The offset may be then utilized, via computing device 525, to correct the location of the medical device on the display with respect to the target and/or correct the registration between the three-dimensional model and tracking system 550 in the area of the target and/or generate a local registration between the three-dimensional model and the fluoroscopic 3D reconstruction in the target area.

System 500 or a similar version of it in conjunction with the method of FIG. 4 may be used in various procedures, other than ENB procedures with the required obvious modifications, and such as laparoscopy or robotic assisted surgery.

The terms "tracking" or "localization", as referred to herein, may be used interchangeably. Although the present disclosure specifically describes the use of an EM tracking system to navigate or determine the location of a medical device, various tracking systems or localization systems may be used or applied with respect to the methods and systems disclosed herein. Such tracking, localization or navigation systems may use various methodologies including electromagnetic, Infra-Red, echolocation, optical or imaging-based methodologies. Such systems may be based on pre-operative imaging and/or real-time imaging.

In some embodiments, the standard fluoroscope may be employed to facilitate navigation and tracking of the medical device, as disclosed, for example, in U.S. Pat. No. 9,743,896 to Averbuch. For example, such fluoroscopy-based localization or navigation methodology may be applied in addition to or instead of the above-mentioned EM tracking methodology, e.g., as described with respect to FIG. 5, to facilitate or enhance navigation of the medical device.

From the foregoing and with reference to the various figure drawings, those skilled in the art will appreciate that certain modifications can also be made to the present disclosure without departing from the scope of the same.

Detailed embodiments of the present disclosure are disclosed herein. However, the disclosed embodiments are merely examples of the disclosure, which may be embodied in various forms and aspects. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of embodiments. Those skilled in the art will envision other modifications within the scope and spirit of the claims appended hereto.

What is claimed is:

1. A system for facilitating identification and marking of a target in a target area in a fluoroscopic image of a body region of a patient, the system comprising:
   (i) one or more storage devices having stored thereon instructions for:
      receiving a CT scan of the body region of the patient, wherein the CT scan includes a marking of the target;
      receiving a sequence of fluoroscopic images including the target area acquired in real-time about a plurality of angles relative to the target, while a medical device is positioned in proximity to the target; and
      generating a fluoroscopic 3D reconstruction based on at least a portion of the sequence of fluoroscopic images;
      generating at least one virtual fluoroscopic image based on the CT scan of the patient, wherein the virtual fluoroscopic image includes the target and the marking of the target;
      receiving a selection of the target in the fluoroscopic 3D reconstruction via a user input;
      receiving a selection of the medical device in the fluoroscopic 3D reconstruction or the sequence of fluoroscopic images;
      determining an offset of the medical device with respect to the target based on the selections of the target and the medical device;
      determining a location of the medical device within the patient based on data provided by a tracking system;
      displaying the target area and the location of the medical device with respect to the target on a display; and
      correcting the display of the location of the medical device with respect to the target based on the offset between the medical device and the target; and
   (ii) at least one hardware processor configured to execute said instructions.

2. The system of claim 1, wherein the one or more storage devices have stored thereon further instructions for directing the user to identify and mark the target in the fluoroscopic 3D reconstruction while using the virtual fluoroscopic image as a reference.

3. The system of claim 1, wherein the user is directed to identify and mark the target in two fluoroscopic slice images of the fluoroscopic 3D reconstruction.

4. The system of claim 1, wherein the generating of the at least one virtual fluoroscopic image comprises:
   generating virtual fluoroscope poses around the target by simulating a fluoroscope trajectory while scanning the target;
   generating virtual fluoroscopic images by projecting the CT scan according to the virtual fluoroscope poses;
   generating a virtual fluoroscopic 3D reconstruction based on the virtual fluoroscopic images; and selecting a slice image from the virtual fluoroscopic 3D reconstruction which comprises the marking of the target.

5. The system of claim 1, wherein the target is a soft-tissue target.

6. The system of claim 1, wherein the one or more storage devices have stored thereon further instructions for:
generating a 3D rendering of the target area based on the CT scan, wherein the display of the target area comprises displaying the 3D rendering; and
registering data generated by the tracking system to the 3D rendering, wherein correcting the display of the location of the medical device with respect to the target comprises updating the registration between the data generated by the tracking system and the 3D rendering or locally registering the fluoroscopic 3D reconstruction to the 3D rendering.

7. The system of claim 1, wherein the target area comprises at least a portion of lungs and the medical device is configured to be navigated to the target area through a luminal network.

8. A method for identifying and marking a target in a target area in an image of a body region of a patient, the method comprising using at least one hardware processor for:
receiving a CT scan of the body region of the patient, wherein the CT scan includes a marking of the target;
receiving a sequence of fluoroscopic images of the target area acquired in real-time about a plurality of angles relative to the target area, while a medical device is positioned in the target area;
generating a fluoroscopic 3D reconstruction of the target area based on at least a portion of the sequence of fluoroscopic images;
generating at least one virtual fluoroscopic image based on the CT scan of the patient, wherein the at least one virtual fluoroscopic image includes the target and the marking of the target;
displaying to a user the at least one virtual fluoroscopic image and the fluoroscopic 3D reconstruction on a display, thereby facilitating the identification of the target in the fluoroscopic 3D reconstruction by the user;
receiving a selection of the target in the fluoroscopic 3D reconstruction via a user input;
receiving a selection of the medical device in the fluoroscopic 3D reconstruction or the sequence of fluoroscopic images;
determining an offset of the medical device with respect to the target based on the selections of the target and the medical device;
determining a location of the medical device within the patient based on data provided by a tracking system;
displaying the target area and the location of the medical device with respect to the target on a display; and
correcting the display of the location of the medical device with respect to the target based on the determined offset between the medical device and the target.

9. The method of claim 8, further comprising using said at least one hardware processor for directing the user to identify and mark the target in the fluoroscopic 3D reconstruction while using the at least one virtual fluoroscopic image as a reference.

10. The method of claim 8, further comprising using said at least one hardware processor for instructing the user to identify and mark the target in two fluoroscopic slice images of the fluoroscopic 3D reconstruction.

11. The method of claim 8, wherein the generating of the at least one virtual fluoroscopic image comprises:
generating virtual fluoroscope poses around the target by simulating a fluoroscope trajectory while scanning the target;
generating virtual fluoroscopic images by projecting the CT scan according to the virtual fluoroscope poses;
generating a virtual fluoroscopic 3D reconstruction based on the virtual fluoroscopic images; and
selecting a slice image from the virtual fluoroscopic 3D reconstruction which comprises the marking of the target.

12. The method of claim 8, wherein the target is a soft-tissue target.

13. The method of claim 8, further comprising using said at least one hardware processor for:
generating a 3D rendering of the target area based on the CT scan, wherein the displaying of the target area comprises displaying the 3D rendering; and
registering data generated by the tracking system to the 3D rendering, wherein correcting the display of the location of the medical device with respect to the target comprises updating the registration between the data generated by the tracking system and the 3D rendering or locally registering the fluoroscopic 3D reconstruction to the 3D rendering.

14. The method of claim 8, wherein a structure of markers is placed with respect to the patient and a fluoroscopic imaging device configured to acquire the sequence of fluoroscopic images such that each image of the sequence of fluoroscopic images comprises a projection of at least a portion of the structure of markers, and wherein generating of the fluoroscopic 3D reconstruction of the target area comprises estimating a pose of the fluoroscopic imaging device while acquiring each image of the sequence of fluoroscopic images based on detection of a possible and most probable projection of the structure of markers as a whole on each image.

15. The method of claim 8, wherein the at least one virtual fluoroscopic image and the fluoroscopic 3D reconstruction are displayed simultaneously.

16. A computer program product comprising a non-transitory computer-readable storage medium having program code embodied therewith, the program code executable by at least one hardware processor to:
receive a pre-operative CT scan of a target area, wherein the pre-operative CT scan includes a marking of the target;
generate at least one virtual fluoroscopic image based on the pre-operative CT scan, wherein the at least one virtual fluoroscopic image includes the target and the marking of the target;
receive a sequence of fluoroscopic images of the target area acquired in real-time about a plurality of angles relative to the target area, while a medical device is positioned in the target area;
generate a fluoroscopic three-dimensional reconstruction of the target area based on the sequence of fluoroscopic images;
display to a user the at least one virtual fluoroscopic image and the fluoroscopic three-dimensional reconstruction,
receive a selection of the target in the fluoroscopic three-dimensional reconstruction via a user input;
receive a selection of the medical device in the fluoroscopic three-dimensional reconstruction or the sequence of fluoroscopic images; and determine an offset of the medical device with respect to the target based on the selections of the target and the medical device.

* * * * *